(12) United States Patent
Beale

(10) Patent No.: US 11,834,124 B2
(45) Date of Patent: Dec. 5, 2023

(54) BICYCLE REAR SUSPENSION SYSTEM

(71) Applicant: Level One Engineering LLC, Portland, OR (US)

(72) Inventor: Luther Mac Beale, Portland, OR (US)

(73) Assignee: Level One Engineering LLC, Portland, OR (US)

(*) Notice: Subject to any disclaimer, the term of this patent is extended or adjusted under 35 U.S.C. 154(b) by 0 days.

(21) Appl. No.: 18/062,447

(22) Filed: Dec. 6, 2022

(65) Prior Publication Data

US 2023/0109511 A1   Apr. 6, 2023

Related U.S. Application Data

(63) Continuation of application No. 17/088,376, filed on Nov. 3, 2020, now Pat. No. 11,518,469, which is a continuation-in-part of application No. 16/230,511, filed on Dec. 21, 2018, now Pat. No. 10,822,049, which is a continuation of application No. 16/016,376, filed on Jun. 22, 2018, now Pat. No. 10,160,512, which is a continuation of application No. 15/669,783, filed on Aug. 4, 2017, now Pat. No. 10,011,318.

(60) Provisional application No. 62/370,815, filed on Aug. 4, 2016.

(51) Int. Cl.
  *B62K 25/28*   (2006.01)
  *B62K 25/26*   (2006.01)
  *B62K 25/30*   (2006.01)

(52) U.S. Cl.
  CPC ............ *B62K 25/286* (2013.01); *B62K 25/26* (2013.01); *B62K 25/30* (2013.01); *B62K 2201/04* (2013.01)

(58) Field of Classification Search
  CPC ...... B62K 25/26; B62K 22/30; B62K 25/286; B62K 2201/04
  USPC ......................................................... 280/284
  See application file for complete search history.

(56) References Cited

U.S. PATENT DOCUMENTS

| 7,066,481 B1* | 6/2006 | Soucek | B62K 25/286 |
|  |  |  | 280/284 |
| 2014/0210180 A1* | 7/2014 | Hudak | B62K 15/00 |
|  |  |  | 280/274 |

* cited by examiner

Primary Examiner — Jacob D Knutson
Assistant Examiner — Felicia L. Brittman
(74) Attorney, Agent, or Firm — Kolitch Romano Dascenzo Gates LLC

(57) ABSTRACT

A bicycle may include a front triangle and a rear suspension system that couples the front triangle to a rear wheel and is dampened by at least one shock absorber. The rear suspension system includes a six-bar linkage having two ternary links separated from each other by one or more binary links, such that the two ternary links do not share a common joint. One of the ternary links may comprise a chain stay. In some examples, the other ternary link may comprise the front triangle. In some examples, the other ternary link may comprise a rocker arm coupling a seat stay link to the shock absorber.

19 Claims, 18 Drawing Sheets

BICYCLE REAR SUSPENSION SYSTEM

CROSS-REFERENCES

The following applications and materials are incorporated herein, in their entireties, for all purposes: U.S. patent application Ser. No. 17/088,376, filed Nov. 3, 2020; U.S. Pat. No. 10,822,049, issued Nov. 3, 2020; U.S. Pat. No. 10,160,512, issued Dec. 25, 2018; U.S. Pat. No. 10,011,318, issued Jul. 3, 2018; and U.S. Provisional Patent Application Ser. No. 62/370,815, filed Aug. 4, 2016.

FIELD

This disclosure relates to bicycle rear suspension systems. More specifically, the disclosed embodiments relate to bicycles having a rear suspension system comprising a six-bar linkage.

INTRODUCTION

A bicycle rear suspension system improves bicycle comfort and performance, particularly for mountain bicycles, by allowing the rear wheel of the bicycle to track the terrain to some extent. This improves rider comfort by reducing the jarring effects felt when passing over uneven terrain on a so-called "hard tail" mountain bicycle (i.e., one that lacks a rear suspension system), and improves performance by increasing traction between the bicycle and the terrain while pedaling, turning and braking.

Various bicycle rear suspension systems have previously been developed. For example, U.S. Pat. No. 5,628,524 to Klassen et al. describes a rear suspension system in which a pair of rotatable links connects the rear triangle of a bicycle to the front triangle and a shock absorber, in a manner resulting in an s-shaped travel path of the rear wheel as the shock absorber is compressed. U.S. Pat. No. 8,066,297 also describes a rear suspension system including a pair of rotatable links connecting the rear triangle to the front triangle and a shock absorber, in which one of the links changes its direction of rotation as the shock absorber is compressed, resulting in improved riding characteristics.

U.S. Pat. No. 8,998,235 to Beale describes a rear suspension system in which three rotatable linkage members connect the rear wheel of a bicycle to the front triangle and a shock absorber. Systems such as these may be referred to as "four-bar linkage systems," with the three linkage members accounting for three of the "bars" and the front triangle accounting for the fourth bar. Four-bar linkage systems may have rear wheel and pedal-related variables which are dependent upon variables related to the shock absorber. It may be desirable to have these two sets of variables independent from one another. Systems such as described in U.S. Pat. No. 8,988,235 to Beale may also have acceleration anti-squat values which are related to braking anti-rise values. It may be advantageous to have anti-squat decoupled from anti-rise. These variables and values are described in greater detail below.

One goal of a rear suspension system such as those described above is to provide a relatively firm response to pedaling inputs, as when ascending or riding on smooth ground, but also to provide a relatively forgiving response to bumps or terrain inputs, as when descending or encountering rough terrain. This reduces the unwanted loss of pedaling energy due to unnecessary shock absorption, while preserving the desirable properties of the suspension system. There remains significant room for improvement in this regard.

SUMMARY

The present disclosure provides systems, apparatuses, and methods relating to rear suspension systems for bicycles.

In some embodiments, a bicycle includes: a bicycle frame; and a rear suspension system coupling the bicycle frame to a rear wheel, the rear suspension system in combination with the frame comprising a six-bar linkage, the six-bar linkage including: a chain stay link comprising a first ternary link coupled at a front end portion by a first joint to a first binary link and by a second joint to a second binary link, and coupled at a rear end portion by a third joint to a seat stay link comprising a third binary link; a fourth binary link coupled by a fourth joint to the seat stay link; wherein the first binary link is coupled to the bicycle frame by a fifth joint, the second binary link is coupled to the bicycle frame by a sixth joint, and the fourth binary link is coupled to the bicycle frame by a seventh joint, such that the bicycle frame is a second ternary link of the six-bar linkage; and a shock absorber coupling the fourth binary link to the bicycle frame; wherein the first binary link is disposed below the second binary link; and wherein the rear wheel is rotatably coupled to the seat stay link of the rear suspension system.

In some embodiments, a bicycle includes: a bicycle frame; and a rear suspension system coupling the bicycle frame to a rear wheel, the rear suspension system in combination with the frame comprising a six-bar linkage, the six-bar linkage including: a chain stay link comprising a first ternary link coupled at a front end portion by a first joint to a first binary link and by a second joint to a second binary link, and coupled at a rear end portion by a third joint to a seat stay link comprising a third binary link; a fourth binary link coupled by a fourth joint to the seat stay link; wherein the first binary link is coupled to the bicycle frame by a fifth joint, the second binary link is coupled to the bicycle frame by a sixth joint, and the fourth binary link is coupled to the bicycle frame by a seventh joint, such that the bicycle frame is a second ternary link of the six-bar linkage; and a shock absorber coupling the fourth binary link to the bicycle frame; wherein the first binary link is disposed below the second binary link; wherein when the shock absorber transitions from an uncompressed state to a fully compressed state, overall rotation of the first binary link is in an opposite direction with respect to overall rotation of the second binary link.

Features, functions, and advantages may be achieved independently in various embodiments of the present disclosure, or may be combined in yet other embodiments, further details of which can be seen with reference to the following description and drawings.

DETAILED DESCRIPTION

Figure 1:
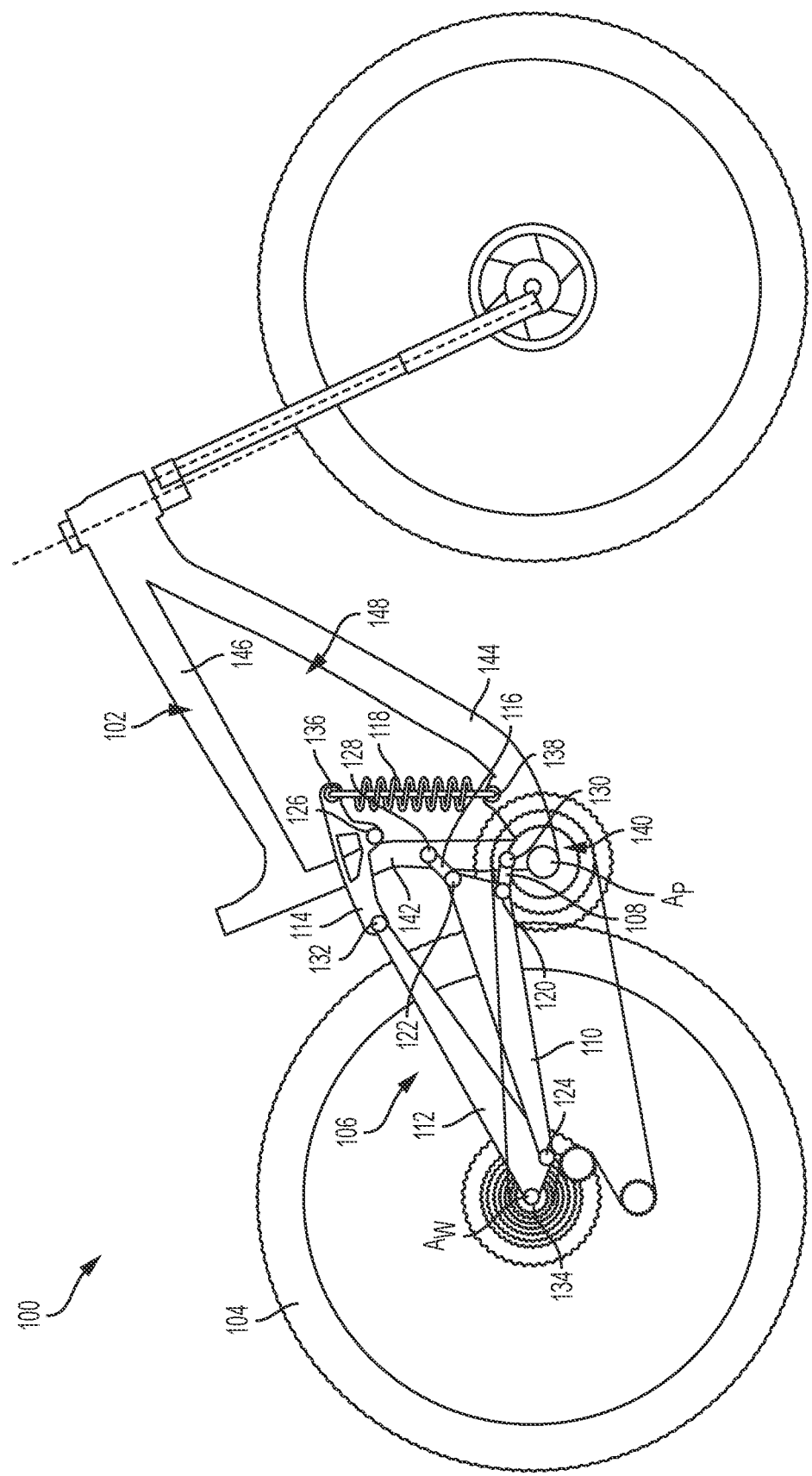
FIG. 1 is a schematic right-side view of portions of an embodiment of a rear suspension bicycle according to aspects of the present teachings, showing a shock absorber in a substantially uncompressed state.

Various aspects and examples of a bicycle having a six-bar linkage rear suspension connecting a rear wheel of the bicycle to the front triangle and a shock absorber, as well as related methods, are described below and illustrated in the associated drawings. Unless otherwise specified, a rear suspension bicycle in accordance with aspects of the present disclosure, and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

The terms "inboard," "outboard," "forward," "rearward," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Providing," in the context of a method, may include receiving, obtaining, purchasing, manufacturing, generating, processing, preprocessing, and/or the like, such that the object or material provided is in a state and configuration for other steps to be carried out.

Furthermore, the present disclosure generally relates to a bicycle rear suspension system having particularly desirable riding characteristics. These characteristics result from a particular configuration of frame portions and linkage members that will be described using various terms that have standard meanings in the field of suspension systems. These terms include:

"Instant center" means the intersection point of two lines, each of which represents the linear extension of one of the linkage members in the suspension system. Note that a six-bar linkage system may have a plurality of instant centers.

"Center of curvature" means the center of a circle that intersects the axle of the rear wheel of the bicycle and has a radius determined from the instantaneous travel path of the rear wheel.

"Shock rate" means the ratio of shock compression distance to rear wheel travel distance.

"Sag" means the compression of the shock absorber when the shock absorber is compressed by the weight of the rider on the bike.

"Chainstay length" or "CSL" means the distance from the axis of the bicycle bottom bracket (i.e., the axis around which both pedals rotate) to the rear wheel axis.

"Chainstay lengthening" or "dCSL" means the rate of change of chainstay length as the shock is compressed, or alternatively as the rear wheel of the bicycle moves vertically upward. The rate of change of chainstay length may be computed relative to vertical wheel travel distance.

"$d^2CSL$" means the rate of change of dCSL as the shock is compressed or as the rear wheel of the bicycle moves vertically upward. The rate of change of dCSL may be computed relative to vertical wheel travel distance.

"Braking anti-rise" is a measure of the suspension system's response to braking, and is defined as a ratio calculated as follows. First, a line is drawn between the point of contact of the rear wheel with the ground and the instant center (defined above). Then the intersection of this line with a vertical line passing through the front wheel axle is found. The height of this intersection point above the ground divided by the height of the center of gravity of the bicycle and the rider is the braking anti-rise value. It is frequently multiplied by 100 and expressed as a percentage.

"Acceleration anti-squat" is a measure of the suspension system's response to acceleration, and is defined as a ratio calculated as follows. First, a line is drawn between the rear wheel axis and the instant center (defined above). A second line is drawn as the chain force line between the front chainring and the rear cassette gear (for a given gear ratio). A third line is then drawn through the intersection of the first line (rear wheel point of contact to instant center) and the second line (chain drive force line) and the rear wheel point of contact. Then the intersection of the third line with a vertical line passing through the front wheel axle is found. The height of this intersection point above the ground divided by the height of the center of gravity of the bicycle and the rider is the acceleration anti-squat value. It is frequently multiplied by one hundred, and expressed as a percentage.

A "Stephenson chain" is a type of six-bar linkage having one four-bar loop and one five-bar loop, the linkage including two ternary (i.e., three-joint) links that are separated from each other by one or more binary (i.e., two-joint) links. Unlike the Watt type of six-bar linkage, the two ternary links of a Stephenson chain are not connected to each other by a shared joint (i.e., no joints in common).

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, bicycle rear suspension systems of the present disclosure may include a six-bar linkage connecting a front triangle of the bike frame to the rear wheel. Links of the six-bar linkage may have varying lengths and arrangements. In general, a planar, one degree-of-freedom linkage in the general form known as a Stephenson chain may be utilized, with two ternary links separated by one or more binary links. For example, a so-called "Stephenson II" or "Stephenson III" topology may be utilized. Motion of the linkage may be dampened, e.g., by a shock absorber device coupled to one or more of the links.

Use of a six-bar linkage in accordance with aspects of the present disclosure may provide an improved rear suspension as compared to other topologies. Typical four-bar suspension systems have an inherent dependency characteristic present in all of the tuned variables of the system. Specifically, in four-bar suspension systems, if one of the performance variables changes significantly as the suspension moves from full extension to full compression, then other variables will as well. For example, there is a relationship between dCSL and the shock rate, and there is a relationship between pedaling anti-squat and shock rate.

Six-bar systems according to the present teachings allow for greater separation of pedal performance variables from shock performance variables, essentially giving the system one characteristic for pedaling performance and a separate characteristic for shock performance. Because of the increased number of links in the linkage, it is possible to have high rates of change in chain growth (dCSL and $d^2CSL$)—a desirable goal for pedaling performance—while having very linear (or at least monotonic) changes in shock rate/leverage ratio—a desirable goal for shock tuning. Accordingly, the shock rate can be tuned independently from dCSL and independently from the anti-squat.

Because there is separation between pedal performance variables and shock tuning variables, it is possible to adjust the geometry of the bike (primarily by changing the position of the rear axle relative to the bottom bracket) without making changes to the shock rate. Geometry can be adjusted more easily for different sizes of bikes without changing key kinematic relationships of the suspension system.

A. First Illustrative Suspension

Figure 2:
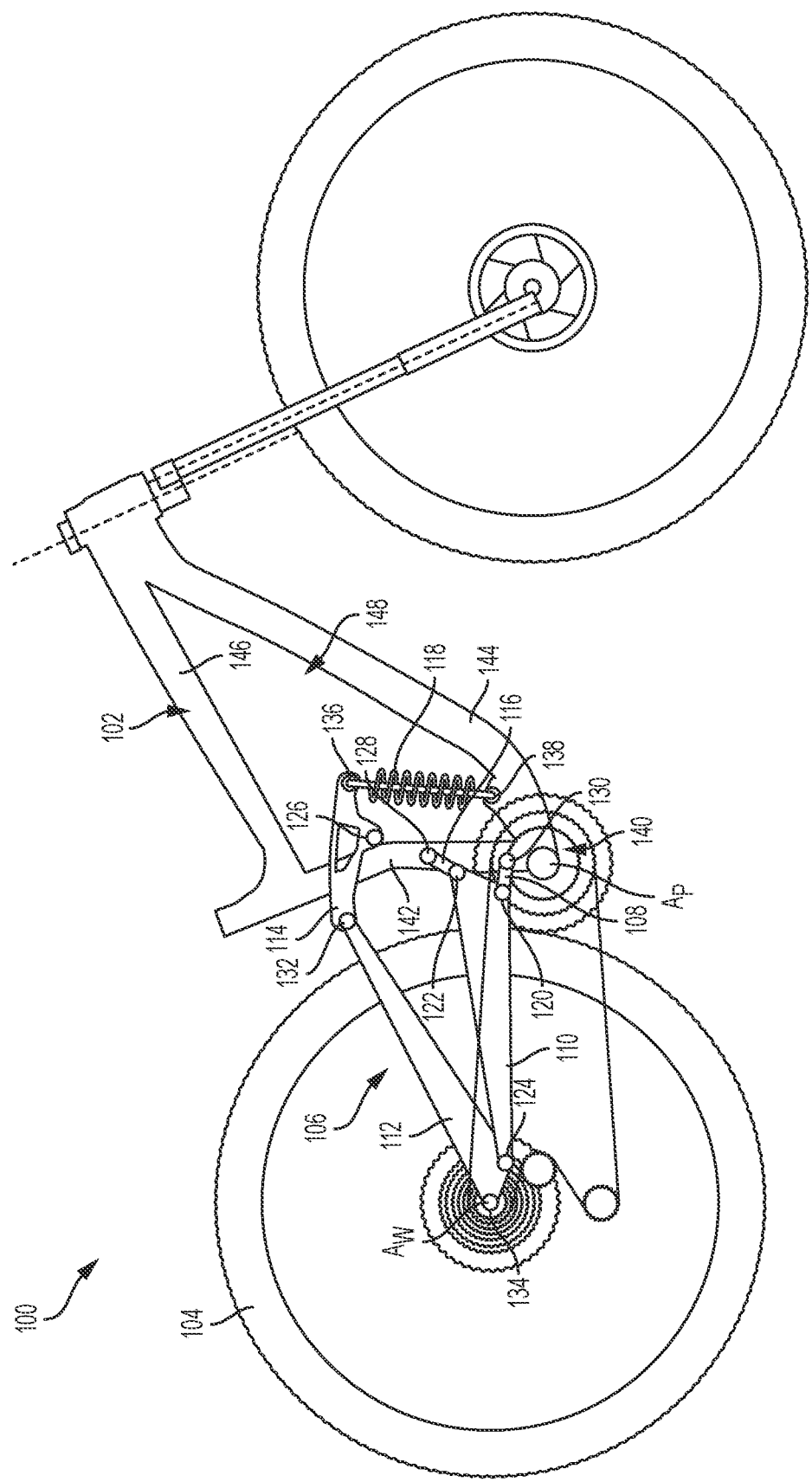
FIG. 2 is a schematic right-side view of the rear suspension bicycle of FIG. 1, showing the shock absorber in a partially compressed state.

This example describes an illustrative rear suspension bicycle; see FIGS. 1-2.

Figure 3:
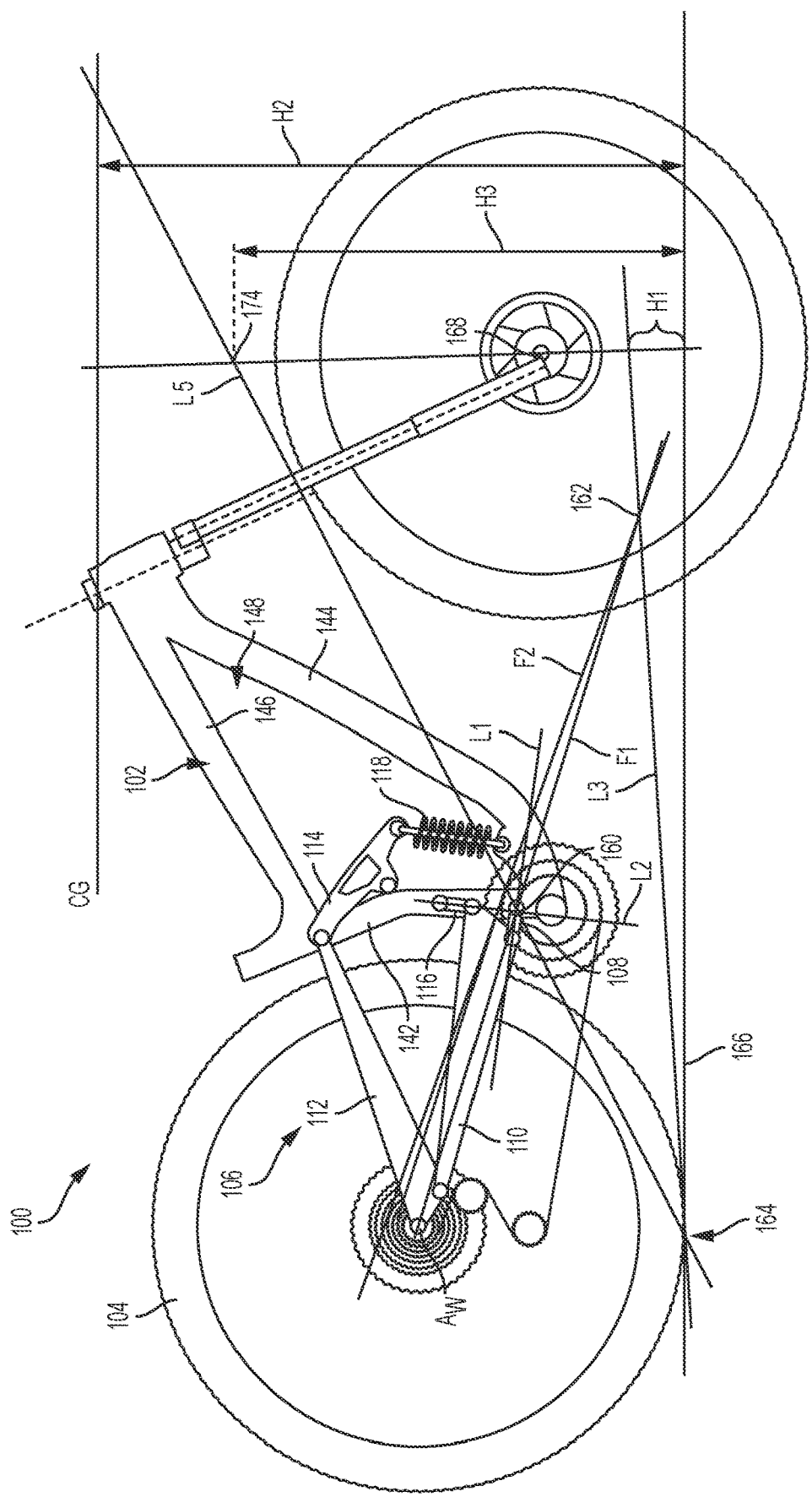
FIG. 3 is a schematic right-side view of the rear suspension bicycle of FIG. 1, showing the shock absorber in a substantially fully compressed state.

FIGS. 1 through 3 depict a schematic right side view of portions of an embodiment of a rear suspension bicycle, generally indicated at 100. For simplicity, FIG. 1 shows portions of the frame of the bicycle. Remaining portions of the bicycle, such as a seat, handlebars, wheels, gears, derailleurs, etc., are unrelated to the present teachings and are either not shown or are only shown schematically. These components are well known in the bicycle art.

Bicycle 100 includes a front triangle 102, a rear wheel 104 having a rear wheel axis $A_W$, and a rear triangle, generally indicated at 106. Rear triangle 106 comprises a six-bar linkage having a Stephenson III topology, with five links that move relative to a stationary or ground link formed by the front triangle (i.e., the frame, in this case the seat tube). Accordingly, bicycle 100 includes a first link 108, a second link 110, a third link 112, a fourth link 114, and a fifth link 116, each of which comprises a respective, single, substantially rigid member pivotably coupled to one or more of the other links as described below. Second link 110 may be described as a chain stay link, because it is in a frame position typical of a bicycle chain stay. Similarly, third link 112 may be described as a seat stay link, because it is in a frame position typical of a bicycle seat stay. Bicycle 100 further includes a shock absorber 118, which is coupled to the linkage at a forward extension of link 114 as shown in FIG. 1. Generally, the first through fifth links (also referred to as linkage members) allow the rear wheel axis $A_W$ to move relative to the front triangle as the shock absorber is compressed. Said another way, the rear wheel pivots relative to the front triangle as a result of the linkage, and this motion is dampened and, in part, limited by shock absorber 118.

In some examples, certain features of bicycle 100 may be symmetric with respect to the plane defined by the bicycle. For example, any of the first through fifth links 108, 110, 112, 114, and 116 may be right-hand links and bicycle 100 may further include corresponding left-hand links. The left-hand links may be mirror images of the right-hand links and may otherwise be identical. In some cases, a left-hand link and a right-hand link may form a substantially rigid, symmetric, link extending on both left and right sides of the bicycle. Accordingly, any description of a link should be understood to apply equally well to its symmetric counterpart or to one side of a single, symmetric link.

In some examples, certain features of bicycle 100 may be asymmetric with respect to the plane defined by the bicycle. In particular, a right-hand component and a left-hand component may have a same projection into the plane defined by the bicycle but may each be disposed a different distance away from the plane of the bicycle. That is, one side of the bicycle may have one or more components closer to or farther from the center line of the bicycle to accommodate, for example, the drivetrain which is usually disposed on only one side of the bicycle. In some examples, a component on one side of the bicycle may be curved while the corresponding component on the other side of the bicycle may be straight.

With continuing reference to FIGS. 1-3, an overview of the six links and seven joints of the six-bar linkage will now be provided. In general, any or all of the joints (also referred to as pivotal connections) may include suitable bearings, collets, and/or the like. In this example, second link 110 and the frame of front triangle 102 are each ternary links, i.e., having three pivoting joints connecting each of them to other links of the linkage. Specifically, second link 110 is coupled at a front end to first link 108 by a first rotating joint 120 and to fifth link 116 by a second rotating joint 122, and further coupled at a rear end to third link 112 by a third rotating joint 124. Front triangle 102 is coupled to fourth link 114 by a fourth rotating joint 126, to fifth link 116 by a fifth rotating joint 128, and to first link 108 by a sixth rotating joint 130.

Accordingly, the four binary links are connected in the linkage as follows. Binary link 108 is coupled at a front end to the front triangle by joint 130 and at a rear end to the second link by joint 120. Binary link 116 is coupled at a front end to the front triangle by joint 128 and at a rear end to the second link by joint 122. Finally, binary link 112 is joined to binary link 114 by a seventh rotating joint 132, and to ternary link 110 by joint 124.

Due to the spacing of joints 120 and 122, second link 110 has a generally triangular shape, as shown in FIGS. 1-3. However, link 110 may be shaped in any suitable manner that comports with the triangular relationship between its three joints. For example, link 110 may have a solid triangular shape, may be formed of three legs or members arranged in a triangle, or may include fewer or more legs arranged in a rigid formation facilitating the spacing of joints 120, 122, and 124. For simplicity, link 110 is shown as a rigid, triangular structure.

In addition to the links and joints that comprise the overall six-bar linkage, other connections and features may be present to facilitate use of the linkage in a rear suspension system. For example, third link 112 (the seat stay link) is a binary link, but includes an additional rotational joint 134 at axis $A_W$ where rear wheel 104 is coupled to the suspension. Joint 134 is proximate to but offset from third rotating joint 124 by a selected distance, e.g., to avoid interference between the wheel axle/hub and the linkage. In some examples, this selected distance is less than approximately 200 mm. In some examples, this selected distance is less than approximately 100 mm. The selected distance may be measured center-to-center on the joints. In some examples, rear wheel 104 may be connected to the chain stay link (i.e., second link 110) instead of the seat stay link (i.e., third link 112) in a similar fashion. However, coupling the rear wheel to the seat stay link facilitates a more complex rear axle path and better tuning capabilities, as compared with connecting the wheel to the chain stay link.

Accordingly, third link 112 is also shown as a rigid triangular arrangement of three members, but may include any suitable shape or number of structural members configured to maintain the relationship between the rotating joints. Additionally, fourth link 114 extends forward of fourth rotating joint 126, creating a pivoting rocker arm having its fulcrum at joint 126. At the forward end of the rocker arm, a pivotal connection 136 couples link 114 to shock absorber 118, thereby providing a mechanical dampener for the linkage by affecting rotation of link 114.

Front triangle 102 includes a bottom bracket shell 140 defining a pedaling axis $A_P$, a seat tube 142 providing for attachment of a seat post (not shown), a down tube 144, and a top tube 146. Shock absorber 118 may be disposed in front of the seat tube and the shock absorber may have a substantially vertical orientation, e.g., generally parallel to the seat tube. A pivotal connection 138 couples the shock absorber and the front triangle, and is disposed on down tube 144 proximate bottom bracket shell 140.

The depicted generally vertical disposition and orientation of the shock absorber in FIG. 1 may have several advantages. In other existing rear suspension bicycles the shock absorber is often attached to the front triangle via the top tube. Coupling the shock absorber to the top tube imparts forces on the top tube that may require a reinforced structure, which may increase the weight of the front triangle. In contrast, as shown in FIG. 1, coupling the shock absorber to the down tube facilitates a lighter top tube.

Another advantage to orienting shock absorber 118 in a generally vertical orientation proximate the seat tube is the space afforded within the front triangle for other items, such as water bottles, battery packs, etc. That is, bicycle 100 may have an empty space 148 between top tube 146 and down tube 144. Empty space 148 may accommodate a water bottle cage (not shown) which could be attached to the down tube (as is common in standard bicycles). Other existing rear suspension bicycles having a shock absorber coupled to the top tube typically do not have an empty space within the front triangle large enough to accommodate a water bottle cage.

Shock absorber 118 is configured to attach via pivotal connection 138 to front triangle 102 and via pivotal connection 136 to the fourth link (i.e., the front end portion of the rocker arm). The shock absorber may be coupled to the six-bar linkage of rear triangle 106 via the fourth link, and is therefore operatively connected to both the front triangle and the rear triangle. During operation of the bicycle, the shock absorber controls the rate and amount of compression of the suspension system due to inputs from bumps and uneven terrain, and thus controls movement of the rear wheel 104 relative to the front triangle 102. The shock absorber typically includes a spring and a damper, or analogous components that function similarly.

Bicycle 100 may comprise a system, including the six-bar linkage defined by the five links and the front triangle, along with the shock absorber, having one degree of freedom. In other words, a single parameter is needed to specify the spatial pose of the linkage. That is, once a position and orientation any one of the first through fifth links (and/or the shock absorber) is known relative to the front triangle, then a position and orientation of the remainder of the first through fifth links (and/or the shock absorber) may be determined.

The six-bar linkage may be configured such that rear wheel rotation axis $A_W$ traces a non-circular arc when the shock absorber moves between an uncompressed state and a compressed state. The center of curvature, defined above, for the non-circular arc may move generally forward as the shock absorber is compressed. As the center of curvature moves forward, an instantaneous radius of curvature of the trajectory of the rotation axis may increase. That is, the trajectory of the rotation axis may have relatively more curvature proximate a point of minimum compression and relatively less curvature proximate a point of maximum compression.

The center of curvature may move from a first location behind pedaling axis $A_P$ to a second location behind, but closer to, the pedaling axis as the shock absorber moves between an uncompressed state and a compressed state. Along with any horizontal movement, the center of curvature may also have vertical movement as the shock absorber is compressed or uncompressed.

The shock rate, defined above, for rear suspension bicycle 100 may rise generally linearly with respect to vertical wheel travel distance as the shock absorber is compressed from as fully uncompressed state to a fully compressed state. A linearly rising shock rate may be desirable. In some examples, the shock rate may rise monotonically with vertical wheel travel distance, if not strictly linearly.

Figure 4:
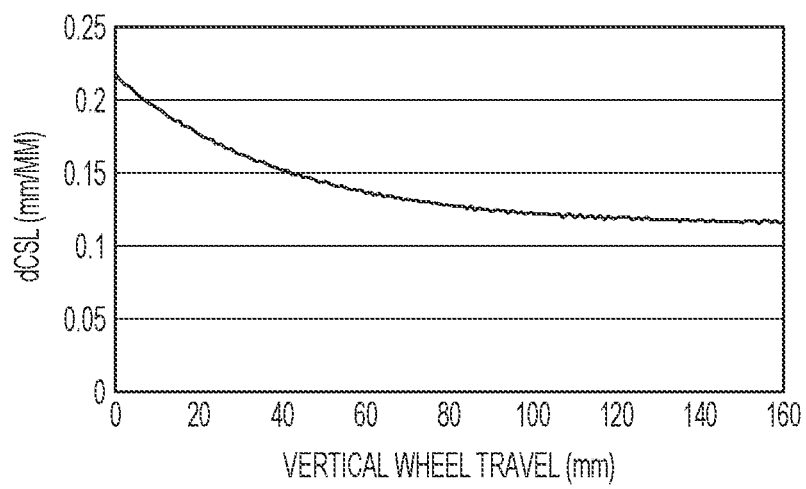
FIG. 4 is an illustrative chart depicting dCSL vs. vertical wheel travel for the bicycle of FIG. 1.
Figure 5:
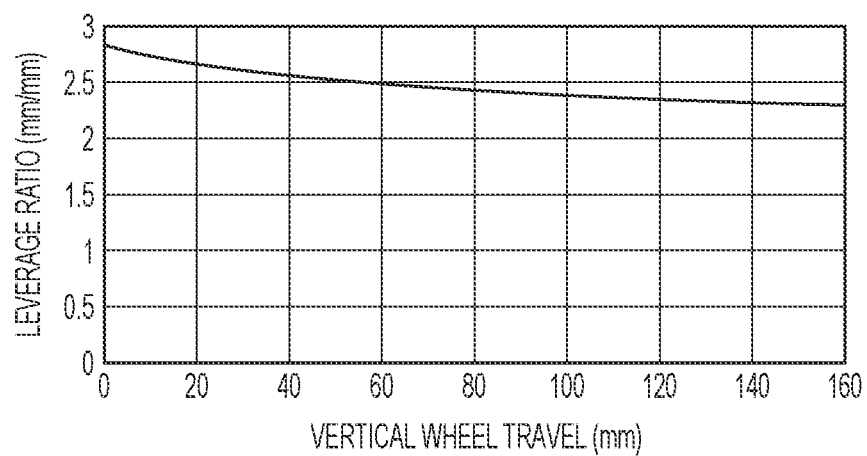
FIG. 5 is an illustrative chart depicting leverage ratio vs. vertical wheel travel for the bicycle of FIG. 1.

A rate of change of chainstay length, i.e. dCSL defined above, with respect to vertical wheel travel distance may be relatively high when the shock absorber is at sag and relatively low when the shock absorber is more deeply compressed. That is, dCSL may vary with compression in a manner that is independent of how shock rate varies with compression. The variation in dCSL with compression may be the opposite of the variation in shock rate with compression. This independence is illustrated for bicycle 100 in the charts of FIGS. 4 and 5. FIG. 4 is a chart illustrating the change in dCSL vs. rear wheel travel for bicycle 100, and FIG. 5 is a chart showing the corresponding change in leverage ratio vs. rear wheel travel. Leverage ratio is the mathematical inverse of shock rate.

The independence of changing shock rate with respect to changing chain stay length is one example of an advantage that six-bar linkage systems may have over linkage systems having fewer links. Namely, systems of the present disclosure may generally separate variables related to the rear wheel and pedaling axes from variables related to the shock absorber. Such rear wheel/pedal related variables may include CSL, dCSL, and $d^2$CSL, among others, and shock absorber related variables may include quantities such as the shock rate and its inverse, the leverage ratio.

In contrast, in rear suspension systems having a four-bar linkage, rear wheel and pedal-related variables may be dependent upon shock-related variables. In particular, for a four-bar linkage suspension to have high levels of chain growth at sag and lower levels of chain growth deeper into travel, the shock rate may also need to be higher at sag and lower deeper into its travel.

FIG. 1 shows rear suspension bicycle 100 where shock absorber 118 is in a substantially uncompressed state. FIG. 2 shows rear suspension bicycle 100 where shock absorber 118 is in a partially compressed state. Finally, FIG. 3 shows bicycle 100 where shock absorber 118 is in a substantially fully compressed state. In moving from the uncompressed state to the compressed state, first link 108 may have an overall unrotated or clockwise (CW) movement with respect to its front joint. In some examples, binary links 108 and 116 rotate in opposite directions overall as the shock is compressed. Further, second link 110 may move in a CW direction, third link 112 may move in a CW direction, fourth link 114 may move in a CW direction, fifth link 116 may move in a CCW direction, all with respect to their front linkage joints. In addition to rotations of the links, a center of mass of each link may translate relative to the front triangle as the shock absorber compresses. As the shock absorber compresses, rear wheel axis $A_W$ may move closer to seat tube 142.

As described above, bicycle 100 may have a plurality of instant centers with respect to various arcuate paths, as each of the links may be extended via a line passing through a pair of pivotal joints of that member, and any two of those lines may cross. An example of an instant center is presently described with respect to FIG. 3. First link 108 may be extended via a line L1 passing through its two pivotal connections at joint 130 and joint 120. Fifth link 116 may be extended via a line L2 passing through its two pivotal connections at joint 128 and joint 122. Lines L1 and L2 cross at an instant center 160. It will be appreciated that as the shock absorber is compressed and the first and fifth links rotate, instant center 160 may move correspondingly.

As mentioned, the first through fifth links may define a plurality of instant centers. Further, a single pair of links may define more than one instant center. For example, second link 110 has three associated joints (122, 126, and 128). Three lines may extend through a pair of any two of these pivotal connections and each of these three lines may intersect an extension of another link, say fourth link 114, and define another instant center.

In some examples there may be three instant centers for a bicycle. In some examples, if one of the plurality of instant centers has a vertical location that is higher than a vertical location of the remainder of the plurality of instant centers, then the instant center having the highest vertical location may be used to determine such values as acceleration anti-squat and/or braking anti-rise, as described below. In some examples, an effective instant center may be determined based on one or more of the plurality of instant centers of the links.

In some examples, an instant center of bicycle 100 may move rearward from an initial location to a final location as the shock absorber is compressed from a substantially uncompressed state to a substantially fully compressed state. In some examples, the initial location of an instant center may be in front of pedaling axis $A_P$. In some examples, the final location may be in front of the pedaling axis. An instant center may move in a vertical direction as the shock absorber is compressed.

As described above, an instant center may be used to define other quantities or variables associated with the rear suspension system, such as acceleration anti-squat and braking anti-rise. An example of determining acceleration anti-squat is presently described.

A force line F1 may be drawn connecting rear wheel axis $A_W$ and instant center 160. A chain force line F2 may be drawn based on the front chainring and the rear cassette gear. Chain force line F2 may be parallel to a top portion of the chain between a rear gear and a front gear. An intersection point 162 is defined where force line F1 crosses chain force line F2. A point of contact 164 (i.e., a contact patch) is defined between rear wheel 104 and ground 166. A line L3 is drawn between point of contact 164 and intersection point 162. A vertical line L4 passes through an axle 168 of a front wheel 170 of the bicycle. An intersection 172 of line L3 and line L4 defines the acceleration anti-squat value as the height H1 of intersection 172 above ground 166. Height H1 may be divided by a height H2 of the combined center of gravity of the bicycle and the rider and multiplied by 100 in order to express the anti-squat value as a percentage. The acceleration anti-squat value may depend upon which instant center is being considered, which gears are engaged by the chain, the size of the rider, and the compression of shock absorber 118.

In some examples, the acceleration anti-squat value may decrease as the shock absorber is compressed. In some examples, the acceleration anti-squat value may decrease form a value substantially equal to 100% to a value of substantially equal to zero as the shock absorber is compressed from a fully uncompressed state to a fully compressed state. In some examples, acceleration anti-squat values greater than 100% are possible if the height H1 of intersection 172 is greater than the height H2 of the center of gravity. In some examples, acceleration anti-squat values less than zero are possible if intersection 172 is below ground level.

An example of determining braking anti-rise is presently described. A line L5 may be drawn between point of contact 164 and instant center 160. An intersection 174 is where line L5 crosses line L4. A height H3 of intersection 174 above ground 166 is the braking anti-rise value. This value may be divided by the height H2 of the center of gravity and multiplied by 100 in order to express the braking anti-rise as a percentage. The braking anti-rise value may depend upon which instant center is being considered, the size of the rider, and the compression of shock absorber 118.

In some examples of bicycle 100, the braking anti-rise value may have a period of decrease followed by a period of increase as the shock absorber is compressed from a fully uncompressed state to a fully compressed state. In some examples, the acceleration anti-squat value may be decoupled from the braking anti-rise value as the shock absorber is compressed. In particular, if the acceleration anti-squat value generally decreases, while the braking anti-rise value decreases and then increases as the shock absorber is compressed, then the acceleration anti-squat value may not depend upon the braking anti-rise value.

It may be advantageous to have the acceleration anti-squat value decoupled from the braking anti-rise value. In systems having only three pivotal links the acceleration anti-squat values are often related to the braking anti-rise values. In systems having five pivotal links as described herein, the acceleration anti-squat values may be unrelated to the braking anti-rise values for any particular configuration of the five movable links.

Based on the above, this embodiment may be described as a bicycle having a rear suspension system with a generally linear (or monotonically changing) shock rate, a higher rate of chain stay lengthening in the statically-loaded sag point, and a rear wheel axle disposed on the seat stay link, where the rotating joint between the seat stay link and the chain stay link is located within no more than approximately 100 mm (or in some examples no more than approximately 200 mm).

In this and other embodiments described herein, the seat stay link and the chain stay link are both significantly longer than the remaining movable links. In some examples, the lengths of the seat stay link and the chain stay link are a dominant or major contributing factor to the longitudinal position of the rear wheel relative to the frame and front wheel of the bike. Accordingly, the seat stay link and the chain stay link may be described as being coupled to the frame by the three other movable (in this case binary) links. However, various length combinations and relationships between the various links are possible and within the scope of the present disclosure.

B. Further Suspension Examples

This section describes various additional embodiments of rear suspensions for bicycles according to aspects of the present teachings; see FIGS. 6-14. All of these additional embodiments may exhibit one or more of the characteristics described above, including (i) pedaling-related variables may be separate or decoupled from shock-related variables, (ii) a change in shock rate or leverage ratio may be independent of a rate of change of chainstay length (dCSL), (iii) generally linear or monotonic increasing shock rate with vertical wheel travel, (iv) decreasing chain growth with vertical wheel travel, and (v) a decreasing anti-squat value as the shock absorber is compressed.

Figure 6:
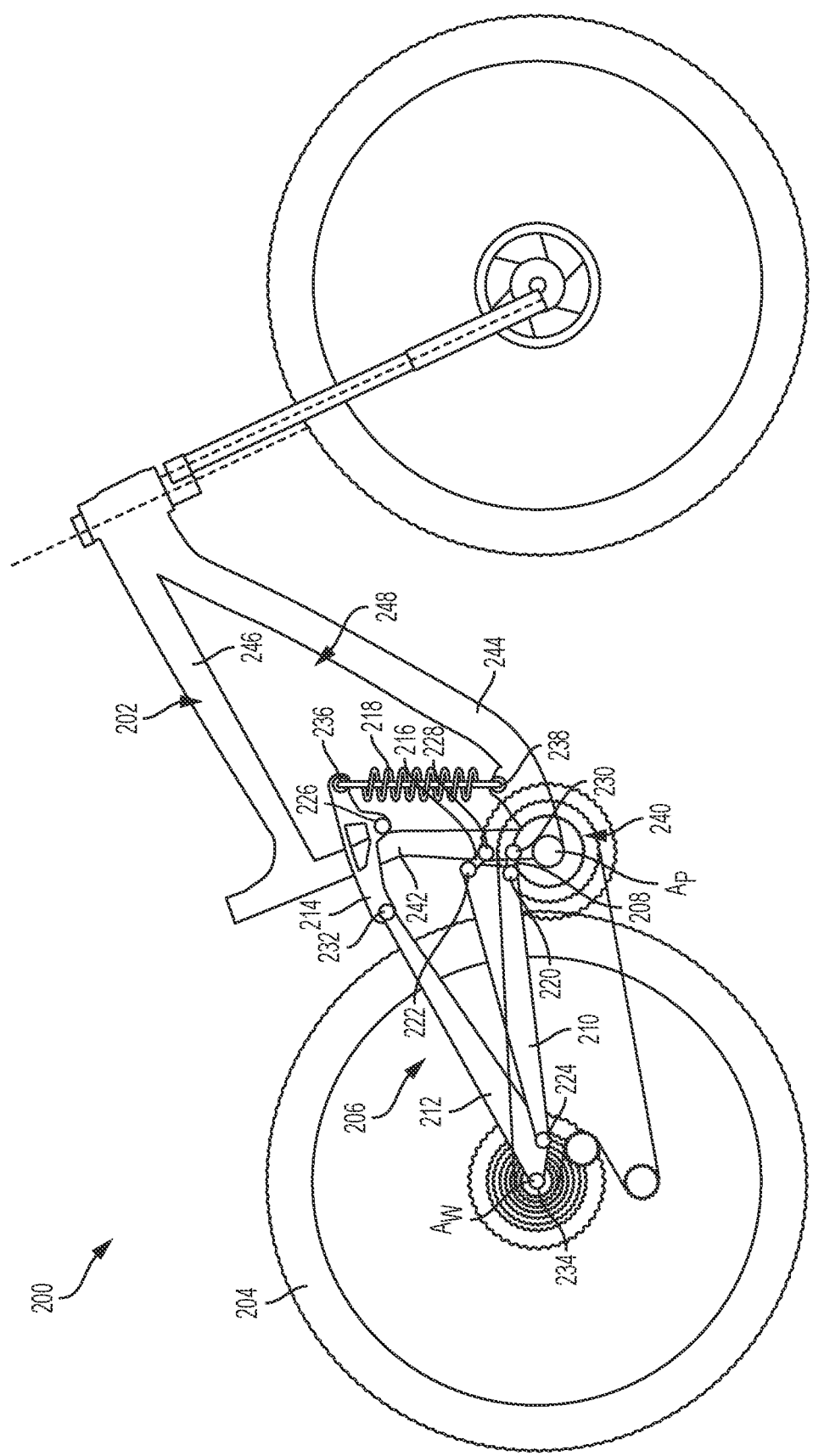
FIG. 6 is a schematic right-side view of portions of another embodiment of a rear suspension bicycle, showing a shock absorber in a substantially uncompressed state, according to aspects of the present teachings.
Figure 7:
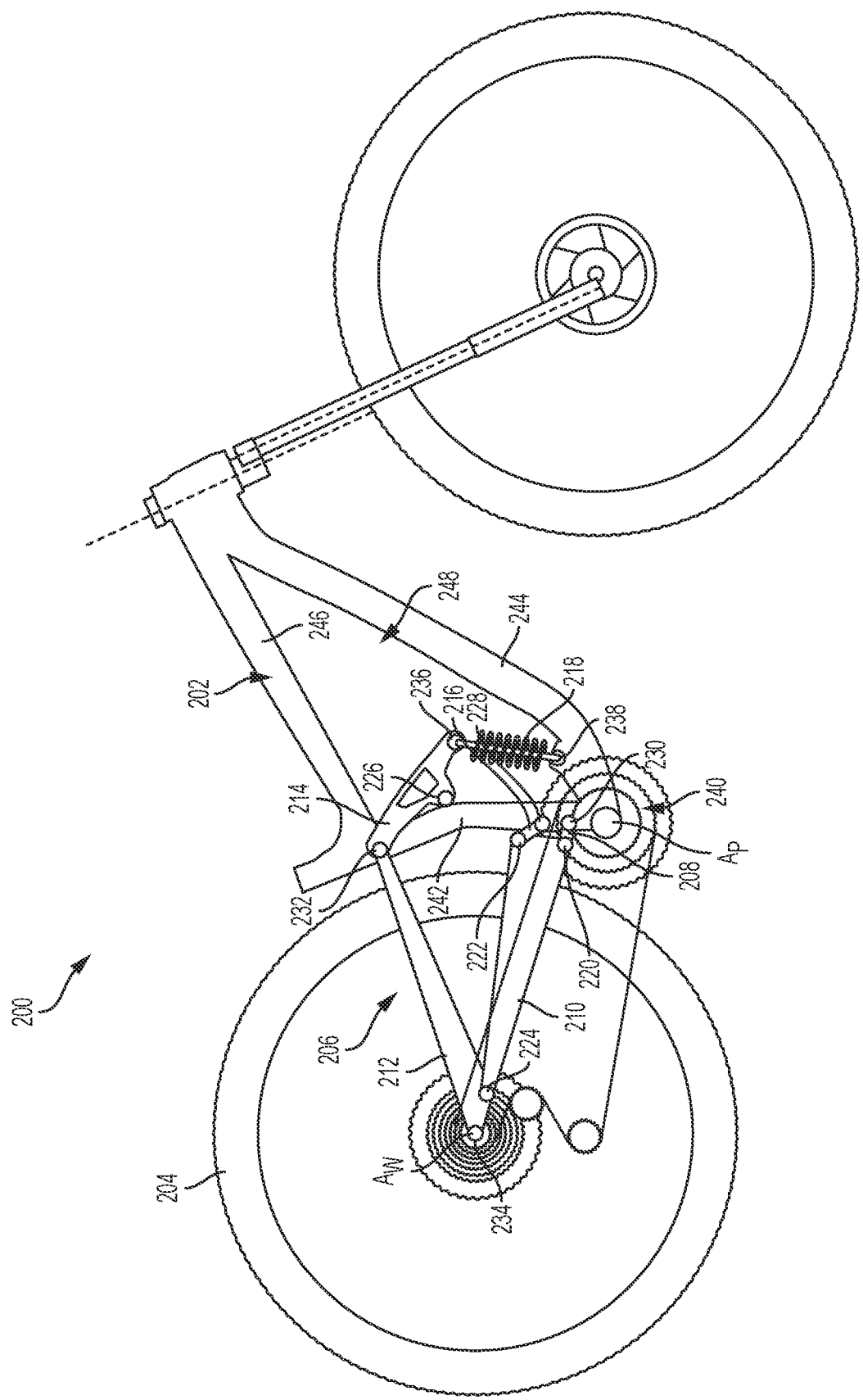
FIG. 7 is a schematic right-side view of the rear suspension bicycle of FIG. 6, showing the shock absorber in a substantially fully compressed state.

FIGS. 6 and 7 are schematic depictions of another illustrative rear suspension bicycle 200, which is similar to bicycle 100 and also comprises an example of a Stephenson III topology. Similar components of bicycle 200 are named and numbered as their substantially similar counterparts in bicycle 100. For example, front triangle 202 is similar to front triangle 102, and is joined to rear wheel 204 by rear triangle 206, corresponding to rear wheel 104 and rear triangle 106. Other than as described below, correspondingly numbered components are substantially as described above. FIG. 6 shows bicycle 200 with a shock absorber 218 in a substantially uncompressed state and FIG. 7 shows bicycle 200 with shock absorber 218 in a substantially fully compressed state.

Bicycle 200 may differ from bicycle 100 in the exact disposition and orientation of the first through fifth links, here referred to as links 208, 210, 212, 214, and 216. For example, first link 208 and fifth link 216 in this example are joined to the bike frame more closely together than in the example of bicycle 100. Specifically, the forward joints are spaced closer together than are the rear joints of these links. In contrast, joints 128 and 130 are spaced farther apart than joints 120 and 122 (see FIGS. 1-3). As with bicycle 100, second link 210 may be described as a chain stay link, because it is in a frame position typical of a bicycle chain stay, and third link 212 may be described as a seat stay link, because it is in a frame position typical of a bicycle seat stay.

With continuing reference to FIGS. 6-7, an overview of the six links and seven joints of this six-bar linkage will now be provided. As described above, any or all of the pivotal connections may include suitable bearings, collets, and/or the like. In this example, second link 210 and the frame of front triangle 202 are each ternary links, i.e., having three pivoting joints connecting each of them to other links of the linkage. Specifically, second link 210 is coupled at a front end to first link 208 by a first rotating joint 220 and to fifth link 216 by a second rotating joint 222, and further coupled at a rear end to third link 212 by a third rotating joint 224. Front triangle 202 is coupled to fourth link 214 by a fourth rotating joint 226, to fifth link 216 by a fifth rotating joint 228, and to first link 208 by a sixth rotating joint 230.

Accordingly, the four binary links are connected in the linkage as follows. Binary link 208 is coupled at a front end to the front triangle by joint 230 and at a rear end to the second link by joint 220. Binary link 216 is coupled at a front end to the front triangle by joint 228 and at a rear end to the second link by joint 222. Finally, binary link 212 is joined to binary link 214 by a seventh rotating joint 232, and to ternary link 210 by joint 224.

Due to the spacing of joints 220 and 222, second link 210 has a generally triangular shape, as shown in FIGS. 6-7. However, link 210 may be shaped in any suitable manner that comports with the triangular relationship between its three joints. For example, link 210 may have a solid triangular shape, may be formed of three legs or members arranged in a triangle, or may include fewer or more legs arranged in a rigid formation facilitating the spacing of joints 220, 222, and 224. For simplicity, link 210 is shown as a rigid, triangular structure.

In addition to the links and joints that comprise the overall six-bar linkage, other connections and features may be present to facilitate use of the linkage in a rear suspension system. For example, third link 212 is a binary link, but includes an additional rotational joint 234 at axis $A_W$ where rear wheel 204 is coupled to the suspension. Joint 234 is offset from third rotating joint 224, e.g., to avoid interference between the wheel axle/hub and the linkage. Accordingly, third link 212 is also shown as a rigid triangular arrangement, but may include any suitable shape or number of structural members configured to maintain the relationship between the rotating joints. Additionally, fourth link 214 extends forward of fourth rotating joint 226, creating a pivoting rocker arm having its fulcrum at joint 226. At the forward end of the rocker arm, another rotating joint 236 couples link 214 to shock absorber 218, thereby providing a mechanical dampener for the linkage by affecting rotation of link 214.

As the shock absorber moves from the substantially uncompressed state (FIG. 6) to the substantially compressed state (FIG. 7), all five of the movable links rotate in a CW direction with respect to their respective forward joints. In general, because fifth link 216 is coupled to front triangle 202 at a position that is vertically lower than its rear joint 222, upward motion of the rear wheel causes the rear end of link 216 to pivot upward as well. In contrast, fifth link 116 of bike 100 is coupled to front triangle 102 at a position that is vertically higher than its rear joint 122, and upward motion of the rear wheel causes the rear end of link 116 to pivot downward.

In some examples, as shock absorber 218 is compressed from a fully uncompressed state to a fully compressed state a braking anti-rise value may have a period of increase followed by a period of decrease. This may generally be the opposite behavior of the braking anti-rise value of bicycle 100. However, an acceleration anti-squat value for bicycle 200 may generally decrease with compression of the shock absorber, a behavior that may be substantially similar to bicycle 100. Again, the difference between bicycle 200 and bicycle 100 illustrates how, in six-bar rear suspension systems having five movable links, the braking anti-rise value may be decoupled from the acceleration anti-rise value. In contrast, in four-bar rear suspension systems having three movable links, the braking anti-rise value is often coupled to the acceleration anti-rise value.

Figure 8:
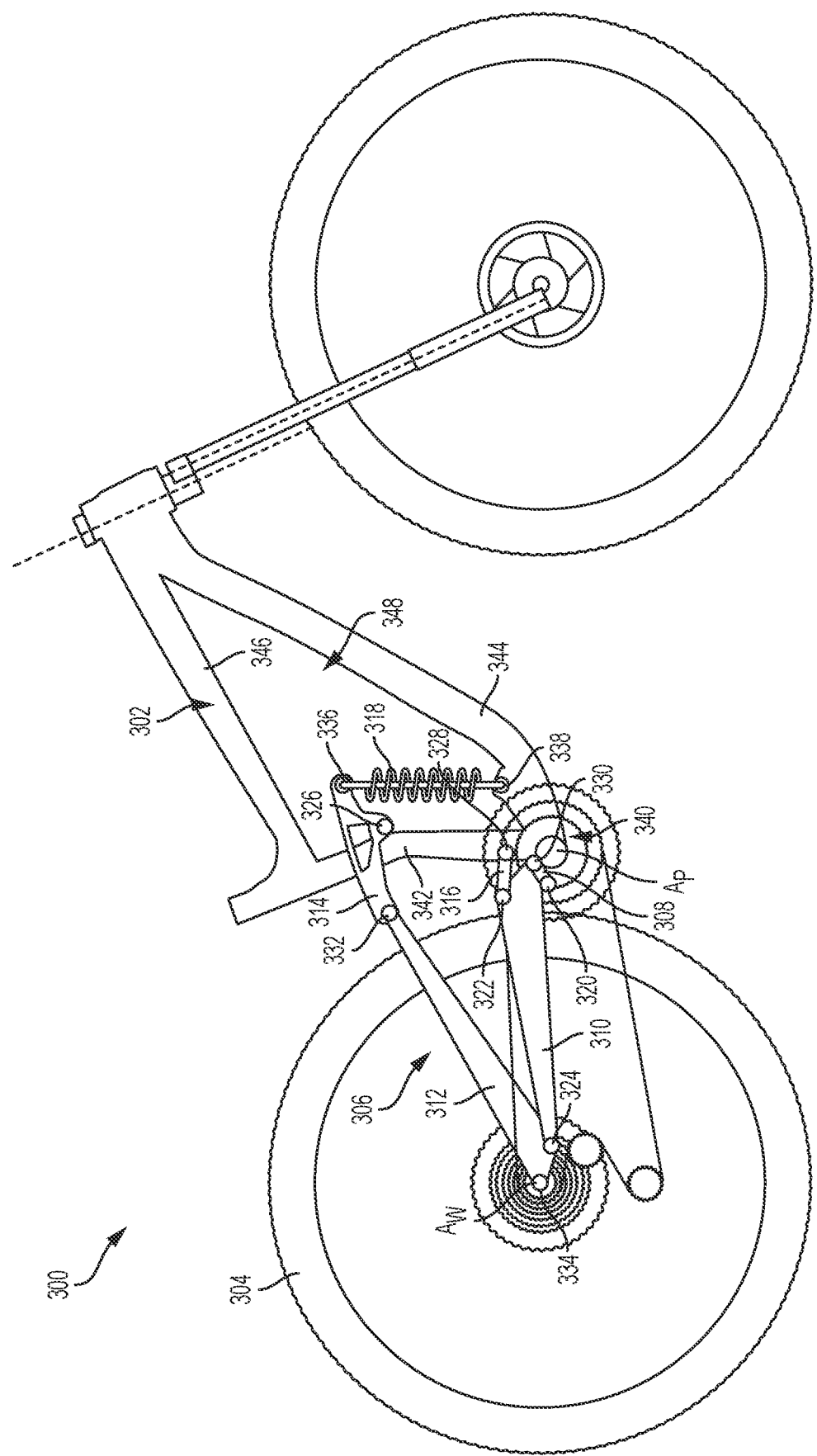
FIG. 8 is a schematic right-side view of portions of another embodiment of a rear suspension bicycle, showing a shock absorber in a substantially uncompressed state, according to aspects of the present teachings.
Figure 9:
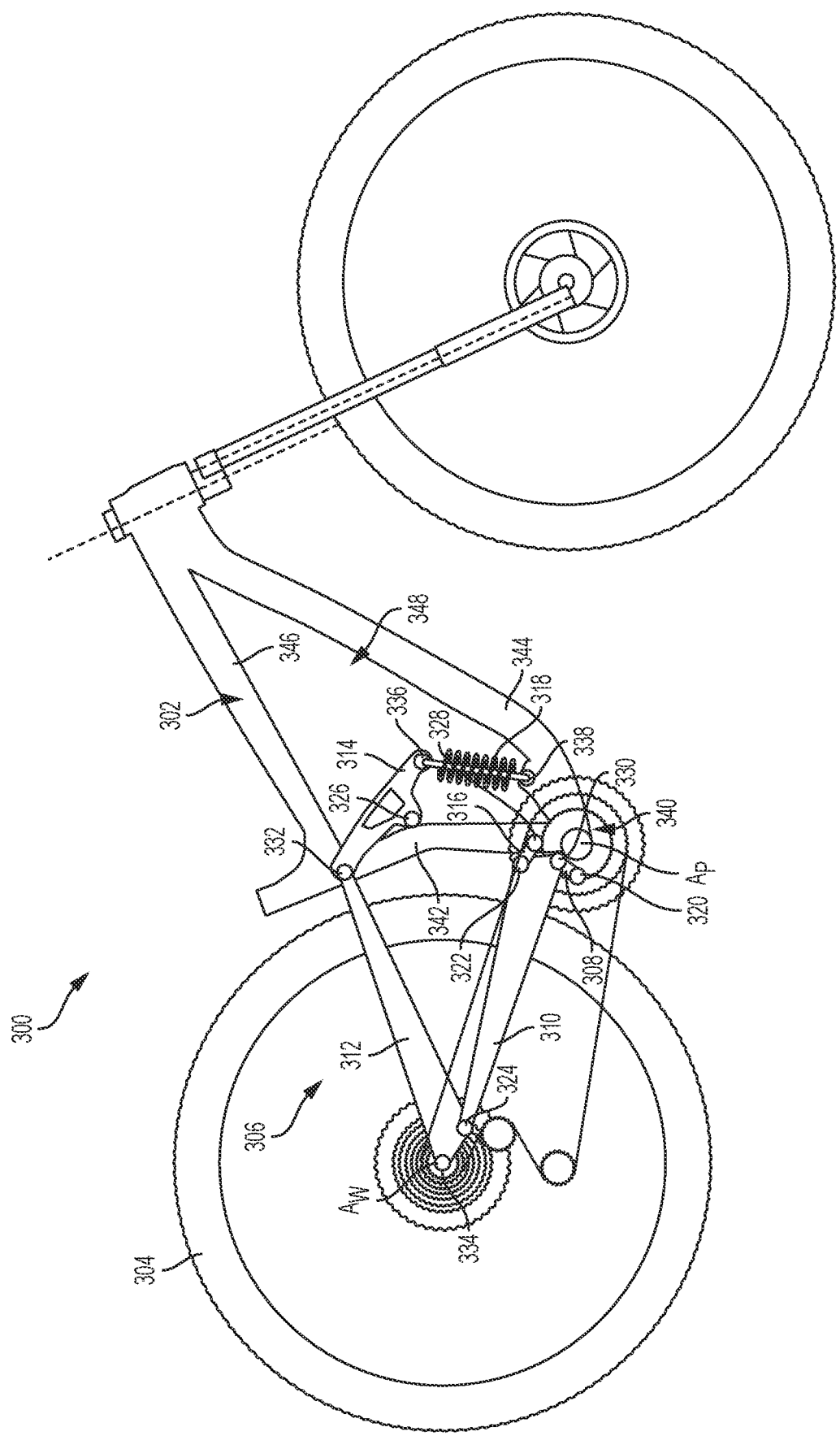
FIG. 9 is a schematic right-side view of the rear suspension bicycle of FIG. 8, showing the shock absorber in a substantially fully compressed state.

FIGS. 8 and 9 are schematic depictions of another illustrative rear suspension bicycle 300, which is similar to bicycles 100 and 200, and also comprises an example of a Stephenson III topology. Similar components of bicycle 300 are named and numbered as their substantially similar counterparts in bicycle 100. For example, front triangle 302 is similar to front triangle 102, and is joined to rear wheel 304 by rear triangle 306, corresponding to rear wheel 104 and rear triangle 106. Other than as described below, correspondingly numbered components are substantially as described above. FIG. 8 shows bicycle 300 with a shock absorber 318 in a substantially uncompressed state and FIG. 9 shows bicycle 300 with shock absorber 318 in a substantially fully compressed state.

Bicycle 300 may differ from bicycle 100 and bicycle 200 in the exact disposition and orientation of the first through fifth links, here referred to as links 308, 310, 312, 314, and 316. For example, the lower front joint of link 310 is generally configured to move into and out of the space between the forward joints of the first and fifth links. In contrast, for example, joint 120 is disposed rearward of joints 128 and 130 at all times. However, upper front joint 122 of link 110 in bicycle 100 does travel into and out of the space between joints 128 and 130. Accordingly, this portion of the linkage of bicycle 300 may, in some respects, be regarded as an upside down version of the corresponding portion of the linkage of bicycle 100. As with bicycle 100, second link 310 may be described as a chain stay link, because it is in a frame position typical of a bicycle chain stay, and third link 312 may be described as a seat stay link, because it is in a frame position typical of a bicycle seat stay.

With continuing reference to FIGS. 8-9, an overview of the six links and seven joints of this six-bar linkage will now be provided. As described above, any or all of the pivotal connections may include suitable bearings, collets, and/or the like. In this example, second link 310 and the frame of front triangle 302 are each ternary links, i.e., having three pivoting joints connecting each of them to other links of the linkage. Specifically, second link 310 is coupled at a front end to first link 308 by a first rotating joint 320 and to fifth link 316 by a second rotating joint 322, and further coupled at a rear end to third link 312 by a third rotating joint 324. Front triangle 302 is coupled to fourth link 314 by a fourth rotating joint 326, to fifth link 316 by a fifth rotating joint 328, and to first link 308 by a sixth rotating joint 330.

Accordingly, the four binary links are connected in the linkage as follows. Binary link 308 is coupled at a front end to the front triangle by joint 330 and at a rear end to the second link by joint 320. Binary link 316 is coupled at a front end to the front triangle by joint 328 and at a rear end to the second link by joint 322. Finally, binary link 312 is joined to binary link 314 by a seventh rotating joint 332, and to ternary link 310 by joint 324.

Due to the spacing of joints 320 and 322, second link 310 has a generally triangular shape, as shown in FIGS. 8-9. However, link 310 may be shaped in any suitable manner that comports with the triangular relationship between its three joints. For example, link 310 may have a solid triangular shape, may be formed of three legs or members arranged in a triangle, or may include fewer or more legs arranged in a rigid formation facilitating the spacing of joints 320, 322, and 324. For simplicity, link 310 is shown as a rigid, triangular structure.

In addition to the links and joints that comprise the overall six-bar linkage, other connections and features may be present to facilitate use of the linkage in a rear suspension system. For example, third link 312 is a binary link, but includes an additional rotational joint 334 at axis $A_W$ where rear wheel 304 is coupled to the suspension. Joint 334 is offset from third rotating joint 324, e.g., to avoid interference between the wheel axle/hub and the linkage. Accordingly, third link 312 is also shown as a rigid triangular arrangement, but may include any suitable shape or number of structural members configured to maintain the relationship between the rotating joints. Additionally, fourth link 314 extends forward of fourth rotating joint 326, creating a pivoting rocker arm having its fulcrum at joint 326. At the forward end of the rocker arm, another rotating joint 336 couples link 314 to shock absorber 318, thereby providing a mechanical dampener for the linkage by affecting rotation of link 314.

As the shock absorber moves from the substantially uncompressed state (FIG. 8) to the substantially compressed state (FIG. 9), all of the movable links rotate in a CW direction with respect to their respective forward joints except first link 308, which moves in a CCW direction. Upward motion of the rear wheel causes second link 310 to pivot upward, pulling its forward end rearward and pulling joint 320 of first link 308 to the rear as well. This is analogous to the movement of fifth link 116 of bike 100, which is configured such that upward motion of the rear wheel causes the rear end of link 116 to pivot downward.

In some examples, as shock absorber 318 is compressed from a fully uncompressed state to a fully compressed state a braking anti-rise value may generally increase. This may generally be different behavior of the braking anti-rise values of bicycle 100 and/or bicycle 200. However, an acceleration anti-squat value for bicycle 300 may generally decrease with compression of the shock absorber, a behavior that may be substantially similar to bicycle 100.

Figure 10:
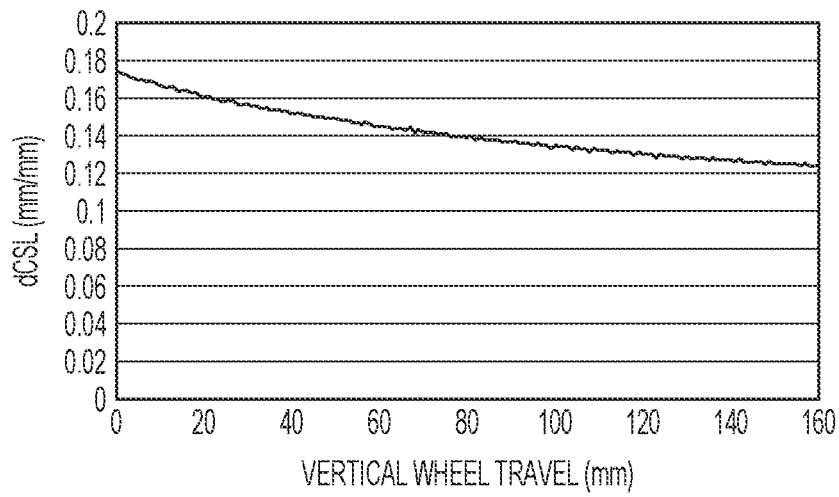
FIG. 10 is an illustrative chart depicting dCSL vs. vertical wheel travel for the bicycle of FIG. 8.
Figure 11:
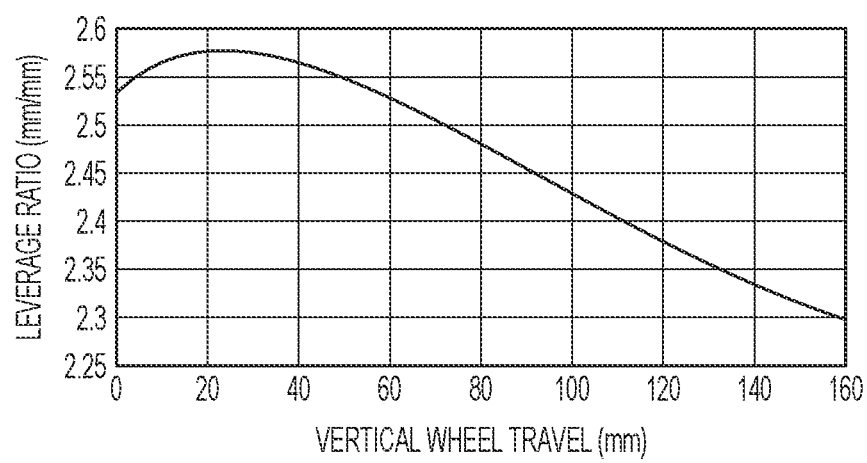
FIG. 11 is an illustrative chart depicting leverage ratio vs. vertical wheel travel for the bicycle of FIG. 8.

FIGS. 10 and 11 show respective charts of dCSL and leverage ratio vs. vertical wheel travel corresponding to the suspension of bicycle 300.

Figure 12:
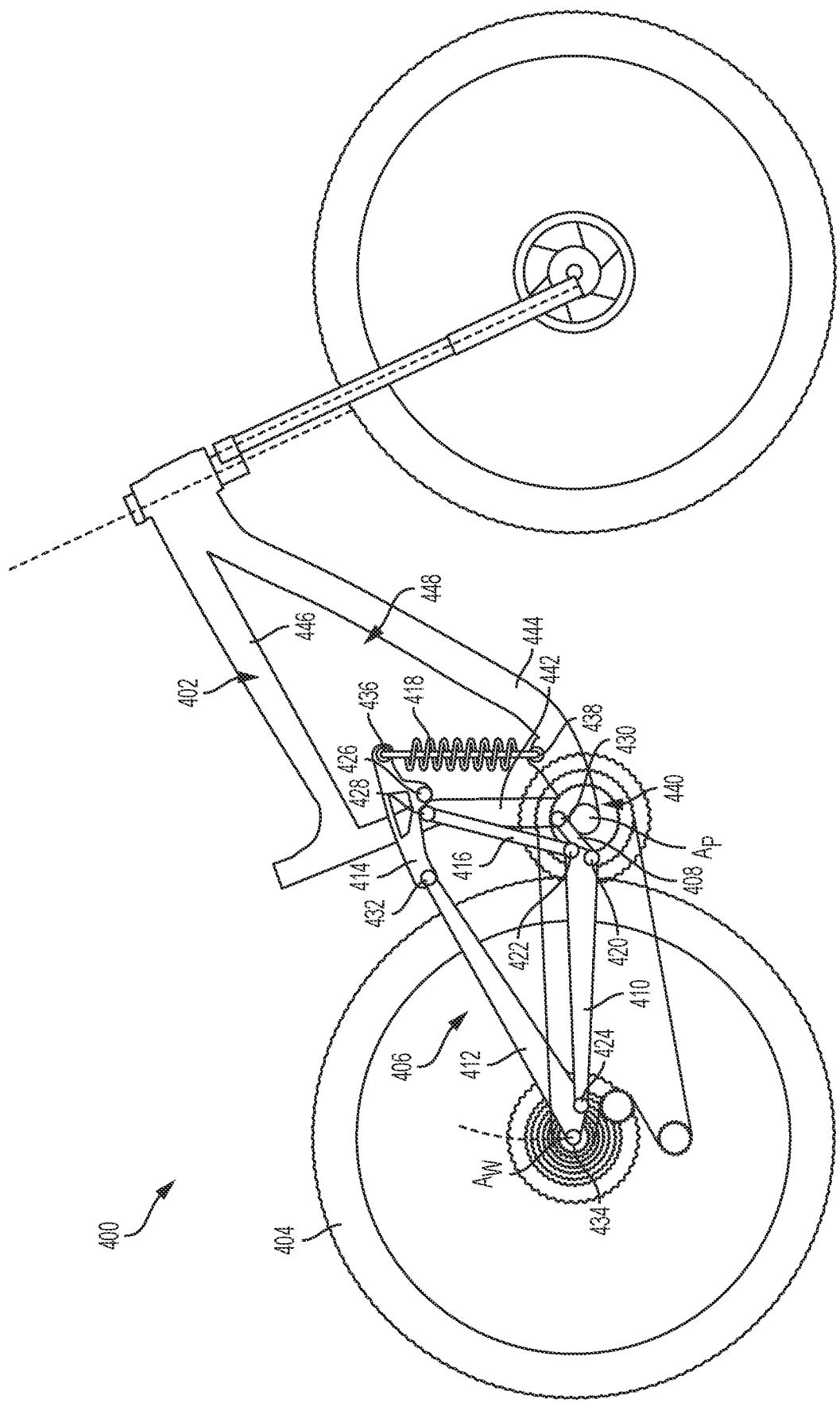
FIG. 12 is a schematic right-side view of portions of another embodiment of a rear suspension bicycle, showing a shock absorber in a substantially uncompressed state, according to aspects of the present teachings.
Figure 13:
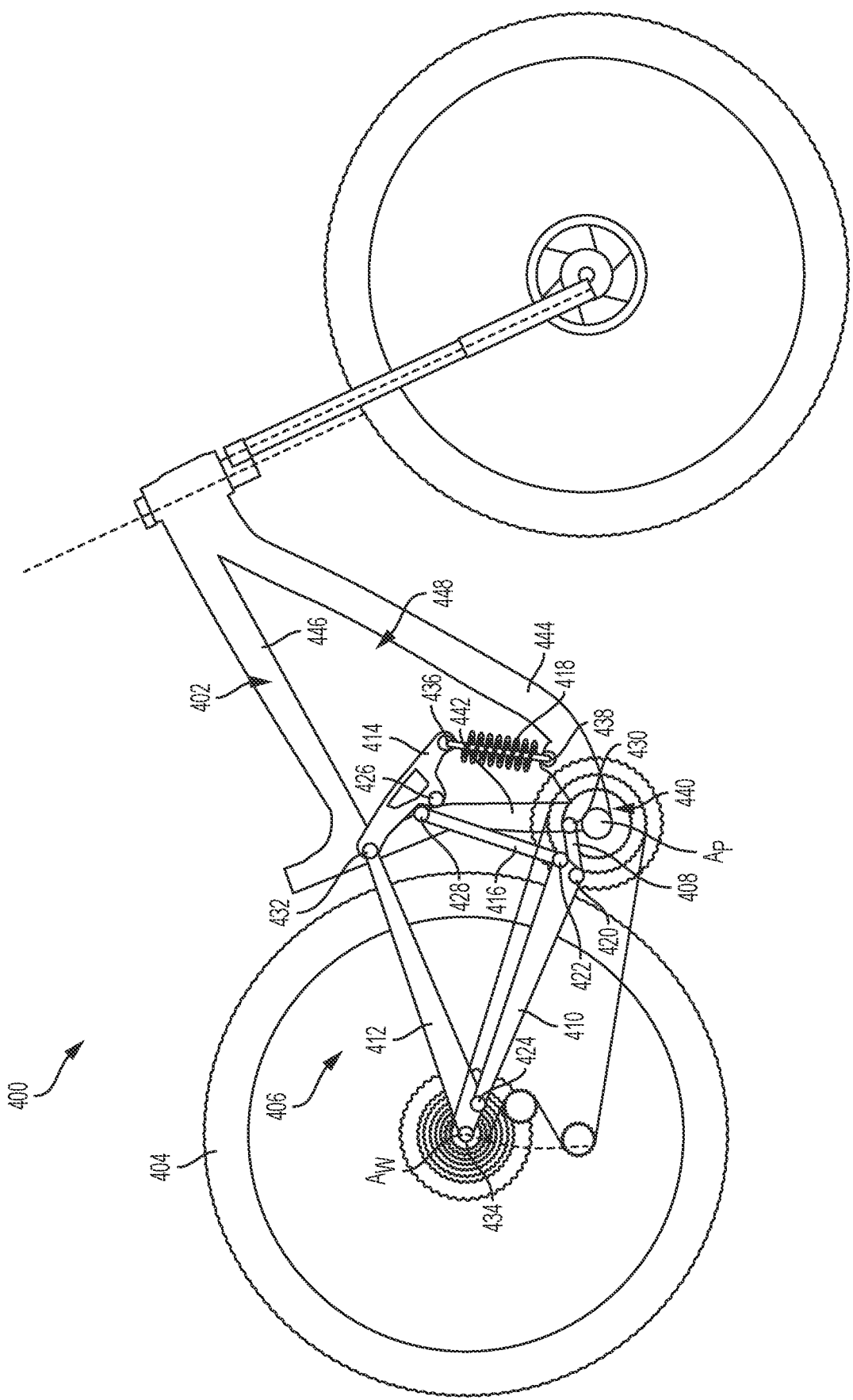
FIG. 13 is a schematic right-side view of the rear suspension bicycle of FIG. 12, showing the shock absorber in a substantially fully compressed state.

FIGS. 12 and 13 are schematic depictions of a rear suspension bicycle 400, which is similar to bicycles 100, 200, and 300, but which comprises a Stephenson II topology, as described below. Similar components of bicycle 400 are named and numbered as their substantially similar counterparts in bicycle 100. For example, front triangle 402 is similar to front triangle 102, and is joined to rear wheel 404 by rear triangle 406, corresponding to rear wheel 104 and rear triangle 106. Other than as described below, correspondingly numbered components are substantially as described above. FIG. 12 shows bicycle 400 with a shock absorber 418 in a substantially uncompressed state and FIG. 13 shows bicycle 400 with shock absorber 418 in a substantially fully compressed state.

Bicycle 400 may differ from bicycles 100, 200, and 300 in the exact disposition and orientation of the first through fifth links, here referred to as links 408, 410, 412, 414, 416. Additionally, bicycle 400 may further differ with respect to which links are coupled to which. In particular, rather than being joined to front triangle 402, fifth link 416 shares a floating, rotating joint 428 with fourth link 414. Accordingly, links 410 and 414 are the ternary links in this example, as opposed to link 410 and the bike frame, and the overall topology is that of a Stephenson II chain as opposed to a Stephenson III chain. As with bicycle 100, second link 410 may be described as a chain stay link, because it is in a frame position typical of a bicycle chain stay, and third link 412 may be described as a seat stay link, because it is in a frame position typical of a bicycle seat stay.

With continuing reference to FIGS. 12-13, an overview of the six links and seven joints of this six-bar linkage will now be provided. As described above, any or all of the pivotal connections may include suitable bearings, collets, and/or the like. In this example, second link 410 and fourth link 414 are each ternary links, i.e., having three pivoting joints connecting each of them to other links of the linkage. Specifically, second link 410 is coupled at a front end to first link 408 by a first rotating joint 420 and to fifth link 416 by a second rotating joint 422, and further coupled at a rear end to third link 412 by a third rotating joint 424. Fourth link 414 is coupled to front triangle 402 by a fourth rotating joint 426, to third link 412 by a seventh rotating joint 432, and to fifth link 416 by joint 428 as described above.

Accordingly, the four binary links are connected in the linkage as follows. Binary link 408 is coupled at a front end to the front triangle by joint 430 and at a rear end to the second link by joint 420. Binary link 416, which is longer than corresponding links 116, 216, 316, is coupled at an upper/front end to the rocker arm (rearward of the main fulcrum) by joint 428 and at a lower/rear end to the second link by joint 422. Finally, binary link 412 is joined to ternary link 414 by a seventh rotating joint 432, and to ternary link 410 by joint 424.

Due to the spacing of joints 420 and 422, second link 410 has a generally triangular shape, as shown in FIGS. 12-13. However, link 410 may be shaped in any suitable manner that comports with the triangular relationship between its three joints. For example, link 410 may have a solid triangular shape, may be formed of three legs or members arranged in a triangle, or may include fewer or more legs arranged in a rigid formation facilitating the spacing of joints 420, 422, and 424. For simplicity, link 410 is shown as a rigid, triangular structure.

In addition to the links and joints that comprise the overall six-bar linkage, other connections and features may be present to facilitate use of the linkage in a rear suspension system. For example, third link 412 is a binary link, but includes an additional rotational joint 434 at axis $A_W$ where rear wheel 404 is coupled to the suspension. Joint 434 is offset from third rotating joint 424, e.g., to avoid interference between the wheel axle/hub and the linkage. Accordingly, third link 412 is also shown as a rigid triangular arrangement, but may include any suitable shape or number of structural members configured to maintain the relationship between the rotating joints. Additionally, fourth link 414 extends forward of fourth rotating joint 426, creating a pivoting rocker arm having its fulcrum at joint 426. At the forward end of the rocker arm, another rotating joint 436 couples link 414 to shock absorber 418, thereby providing a mechanical dampener for the linkage by affecting rotation of link 414.

As the shock absorber moves from the substantially uncompressed state (FIG. 12) to the substantially compressed state (FIG. 13), all five of the movable links rotate in a CW direction with respect to their respective forward joints, and may translate in a generally vertical direction. In some examples, as shock absorber 418 is compressed from a fully uncompressed state to a fully compressed state a braking anti-rise value may have a period of decrease followed by a period of increase. This may qualitatively be similar to behavior of the braking anti-rise values of bicycle 100 and qualitatively different from the behavior of the braking anti-rise values of bicycle 200 and/or bicycle 300. However, an acceleration anti-squat value for bicycle 400 may generally decrease with compression of the shock absorber, a behavior that may be substantially similar to bicycle 100.

Figure 14:
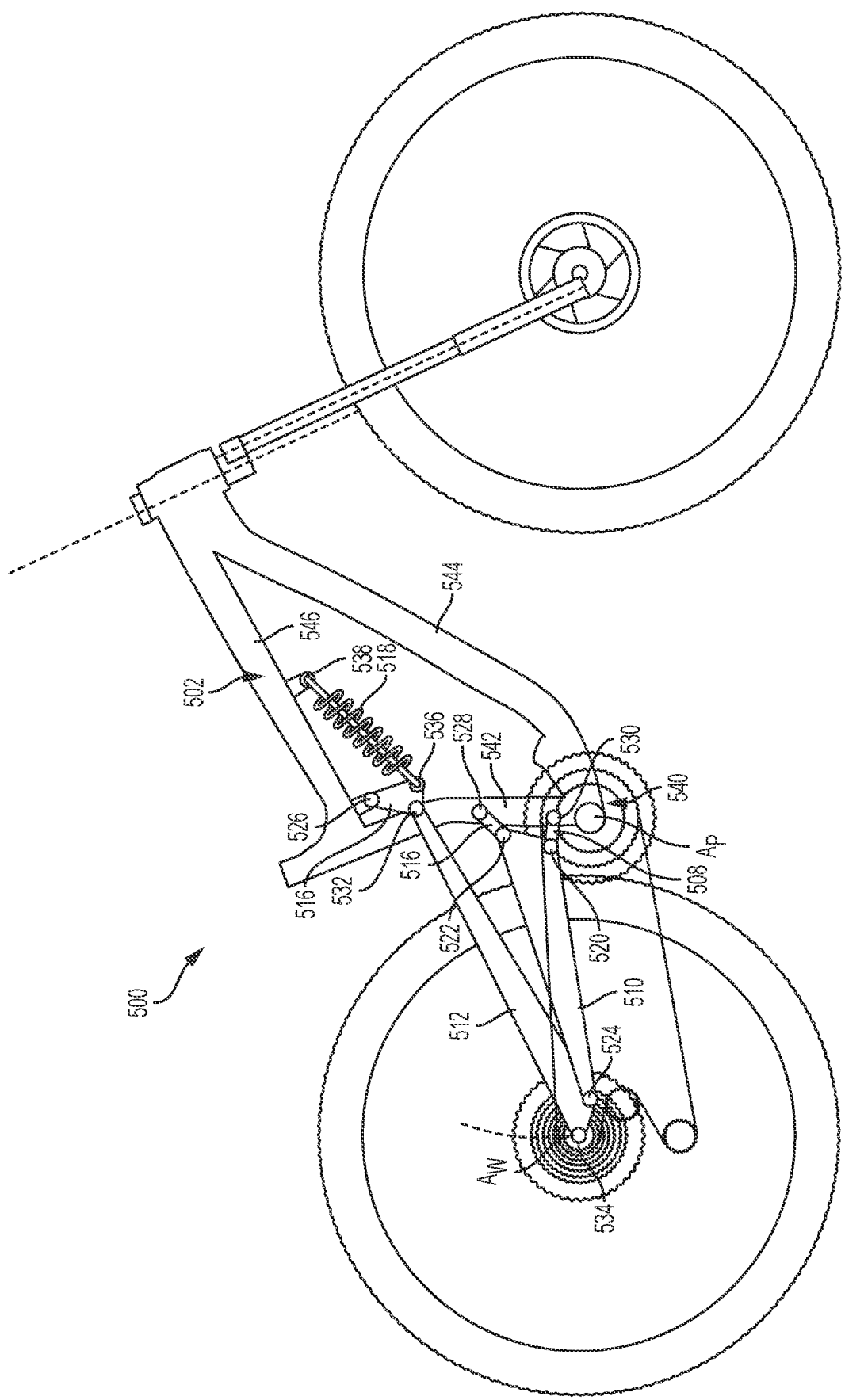
FIG. 14 is a schematic right-side view of portions of another embodiment of a rear suspension bicycle, showing a shock absorber in a substantially uncompressed state, according to aspects of the present teachings.

FIG. 14 is a schematic depiction of another rear suspension bicycle 500, which is similar to bicycles 100, 200, 300, 400. Similar components of bicycle 500 are named and numbered as their substantially similar counterparts in bicycle 100. For example, front triangle 502 is similar to front triangle 102, and is joined to rear wheel 504 by rear triangle 506, corresponding to rear wheel 104 and rear triangle 106. Other than as described below, correspondingly numbered components are substantially as described above. FIG. 14 shows bicycle 500 with a shock absorber 518 in a substantially uncompressed state.

Bicycle 500 may differ from bicycle 100 in the exact disposition and orientation of the first through fifth links, referred to here as links 508, 510, 512, 514, 516, and shock absorber 518. In particular, fourth link 514 may have a different configuration than fourth link 114 and shock absorber 518 may have a different disposition and orientation than shock absorber 118. Additionally, third link 512 may have a greater length than third link 112 as a rotating joint 532 between third link 512 and fourth link 514 may be farther forward than rotating joint 132. As with bicycle 100, second link 510 may be described as a chain stay link, because it is in a frame position typical of a bicycle chain stay, and third link 512 may be described as a seat stay link, because it is in a frame position typical of a bicycle seat stay.

In this example, fourth link 514 is coupled to a top tube 546 of front triangle 502 and pivots or rocks on an upper rotating joint 526. In contrast, fourth link 114 is coupled to front triangle 102 at rotating joint 126 on seat tube 142. Shock absorber 518 is coupled to fourth link 514 at a rotating joint 536, and to top tube 546 at a rotating joint 538. In contrast, shock absorber 118 is coupled to the front triangle at joint 138 proximate bottom bracket shell 140 and/or down tube 144.

As shock absorber 518 moves from the substantially uncompressed state shown in FIG. 14 to a substantially compressed state, the rocker arm formed by fourth link 514 rotates in a CCW direction. In contrast, fourth link 114 rotates in a CW direction as shock absorber 118 is compressed.

It will be appreciated that the first, second, third, and fifth links of bicycle 500 are most similar to the first, second, third, and fifth links of bicycle 100, respectively, and that the primary differences between bicycles 500 and 100 are (a) the CW rotation of the fourth link and (b) the shock absorber being coupled to the top tube. It will also be appreciated that any or all of bicycles 200, 300, and 400 may also be reconfigured to include a clockwise rotating fourth link and a shock absorber coupled to the top tube as shown in FIG. 14.

C. Another Illustrative Suspension

This section describes an illustrative embodiment of the rear suspension system described with respect to FIG. 1, as well as various aspects thereof; see FIGS. 15-22. The rear suspension described in this section has a construction similar to the suspension of FIG. 1, unless otherwise indicated.

Bicycle 100' includes a front triangle 102', a rear wheel axis $A_W$', and a rear triangle, generally indicated at 106'. Rear triangle 106' comprises a six-bar linkage having a Stephenson III topology, with five links that move relative to a stationary or ground link formed by the front triangle (i.e., the frame, in this case the seat tube). Accordingly, bicycle 100' includes a first link 108', a second link 110', a third link 112', a fourth link 114', and a fifth link 116', each of which comprises a respective, single, substantially rigid member pivotably coupled to one or more of the other links as described below. First link 108' may be described as the bottom link, and fifth link 116' may be described as the middle link. Second link 110' may be described as the chain stay link, because it is in a frame position typical of a bicycle chain stay. Similarly, third link 112' may be described as the seat stay link, because it is in a frame position typical of a bicycle seat stay. Finally, fourth link 114' may be referred to as a rocker.

Figure 15:
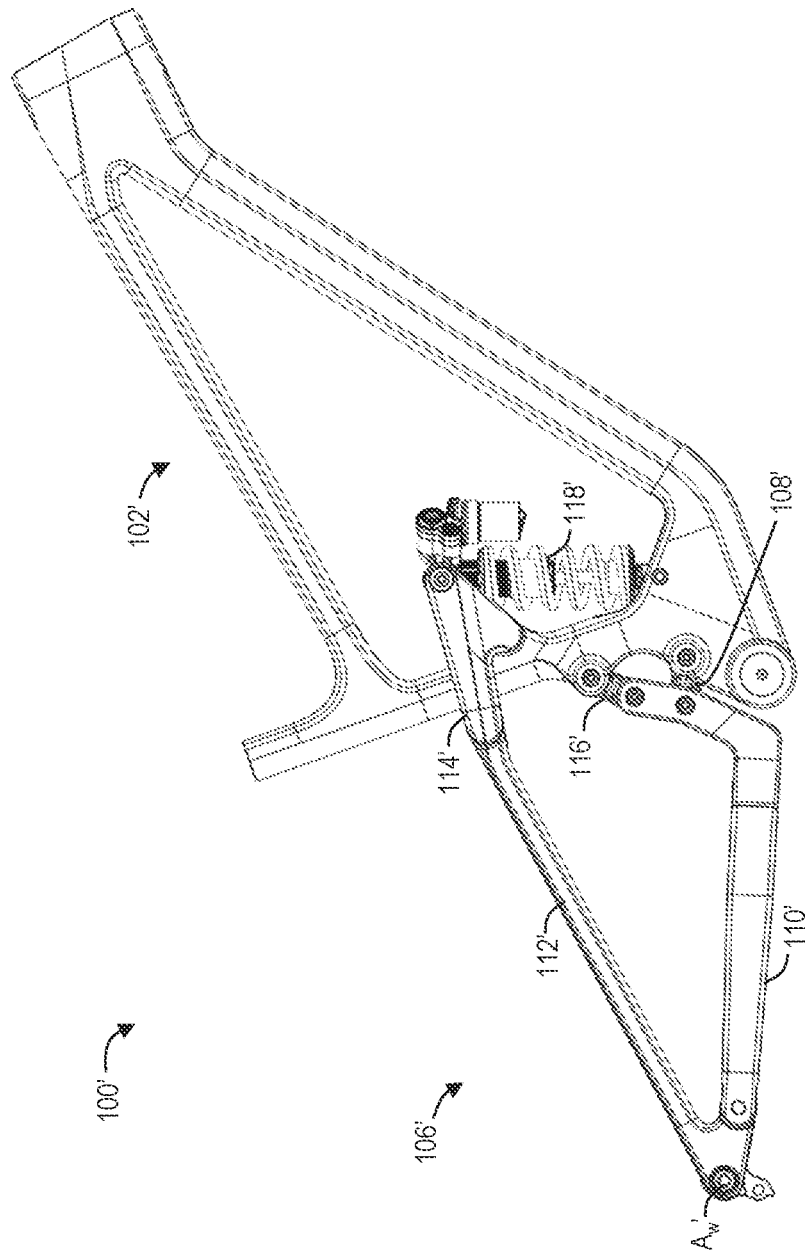
FIG. 15 is a side view of another illustrative embodiment of the rear suspension of FIG. 1.

Bicycle 100' further includes a shock absorber 118', which is coupled to the linkage at a forward extension of link 114' as shown in FIG. 15. Generally, the first through fifth links (also referred to as linkage members) allow the rear wheel axis $A_W$ to move relative to the front triangle as the shock absorber is compressed. Said another way, the rear wheel pivots relative to the front triangle as a result of the linkage, and this motion is dampened and, in part, limited by shock absorber 118'.

Figure 16:
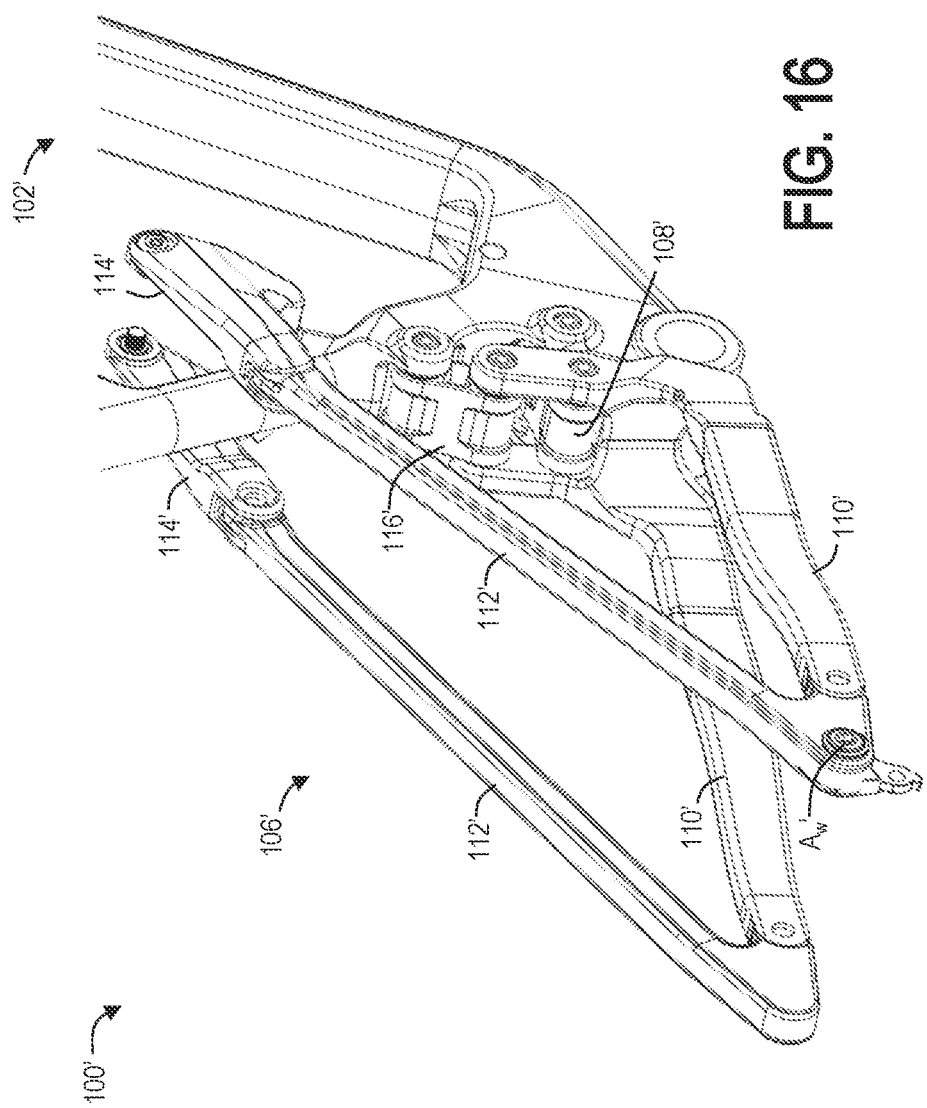
FIG. 16 is an oblique view of the rear suspension of FIG. 15, with the shock absorber removed to show underlying features.

With continuing reference to FIGS. 15-16, an overview of the six links and seven joints of the six-bar linkage will now be provided. In general, any or all of the joints (also referred to as pivotal connections) may include suitable bearings, collets, and/or the like, although specific examples are laid out below. In this example, second link 110' and the frame of front triangle 102' are each ternary links, i.e., having three pivoting joints connecting each of them to other links of the linkage. Specifically, chain stay link 110' is coupled at a front end to the bottom and middle links by a pair of rotating joints, and further coupled at a rear end to seat stay link 112' by a third rotating joint. Front triangle 102' also has three rotating joints, respectively coupling the frame to the rocker and the middle and bottom links.

Accordingly, the four binary links are connected in the linkage as follows. Binary link 108' is coupled at a front end to the front triangle and at a rear end to the second link. Binary link 116' is coupled at a front end to the front triangle and at a rear end to the second link. Finally, binary link 112' is joined to binary link 114' and to ternary link 110'. All of the seven rotating joints are substantially as described with respect to the rear suspension of FIGS. 1-3.

The chain stay link (i.e., third link 112') is a binary link, but includes an additional rotational joint at axis $A_W$ where the rear wheel is coupled to the suspension. This joint is proximate to but offset from the rotating joint of the six-bar linkage by a selected distance, e.g., to avoid interference between the wheel axle/hub and the linkage.

Turning now to FIGS. 17-22, links 116' and 108' (or portions thereof) are depicted as isolated from the remainder of the suspension system. As explained above, the geometry of the present suspension is configured such that pedaling performance and shock response characteristics can be tuned independently from each other. The present arrangement takes advantage of that by providing bottom and middle links (108', 116') having the same length L. In other words, other aspects of the suspension can be tweaked to facilitate effectively identical bottom and middle links. Length L may be measured in any suitable fashion. For example, length L may be measured between the respective centers of rotation of the two openings of the link. In other words, L may be referred to as a center-to-center distance or length.

Figure 19:
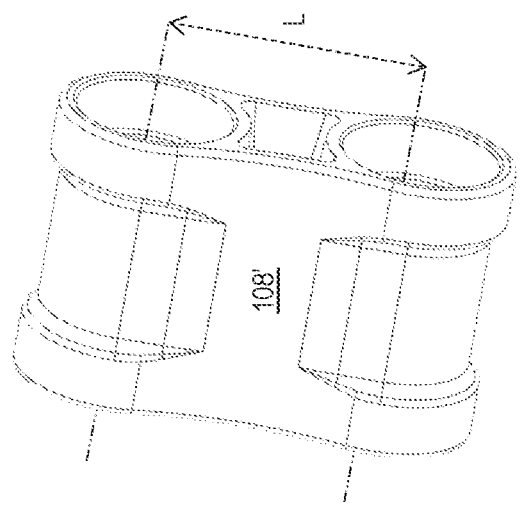
FIG. 19 is an isometric view of another link of the suspension of FIGS. 15 and 16, depicting the same length as the link of FIG. 18.
Figure 18:
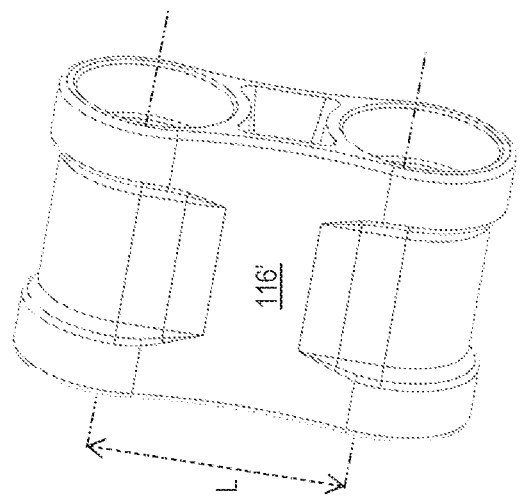
FIG. 18 is an isometric view of one link of the suspension of FIGS. 15 and 16.
Figure 20:
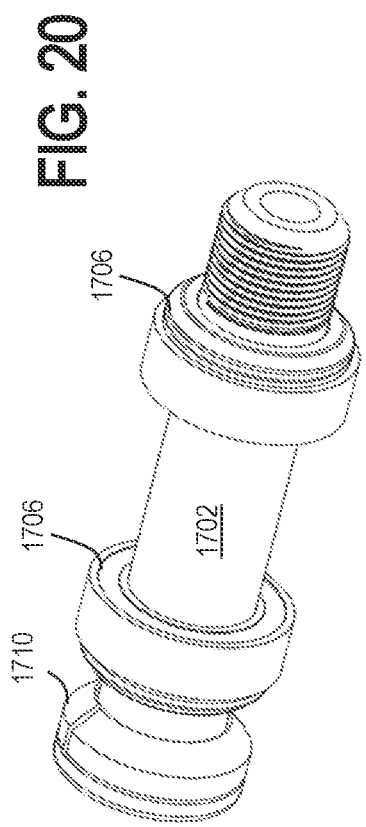
FIG. 20 is an isometric view of a bolt and associated hardware utilized in the link of FIG. 17.
Figure 21:
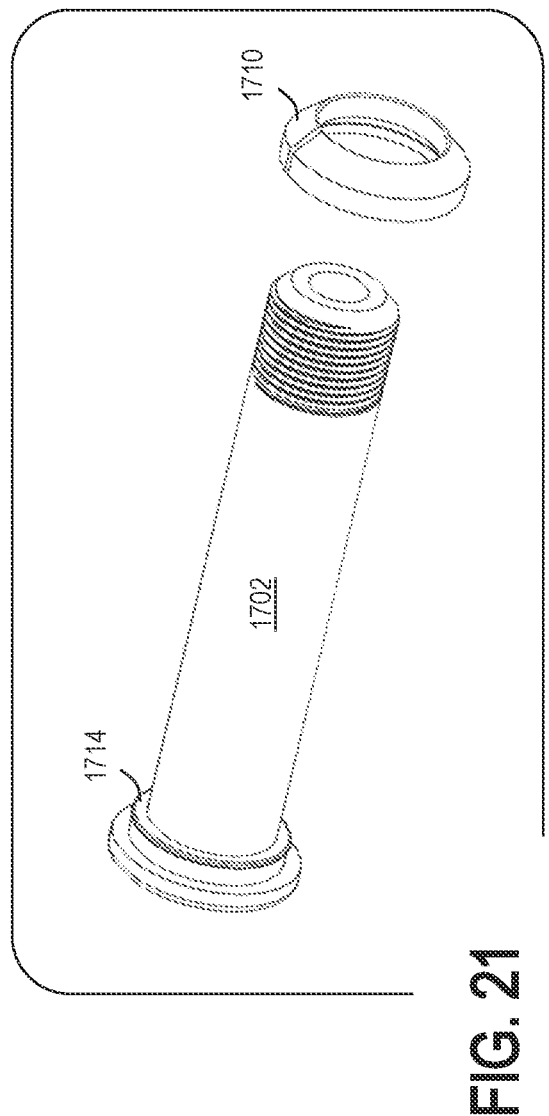
FIG. 21 is a partially exploded view of the bolt and some of the associated hardware of FIG. 20.

As depicted in FIGS. 18 and 19, link 108' and link 116' may be identical or substantially identical. In some examples, links 108' and 116' are interchangeable and/or physically indistinguishable from teach other. Accordingly, only a single link design is needed for the two different links of the six-bar linkage. This reduces manufacturing, maintenance, repair, and replacement costs.

Figure 17:
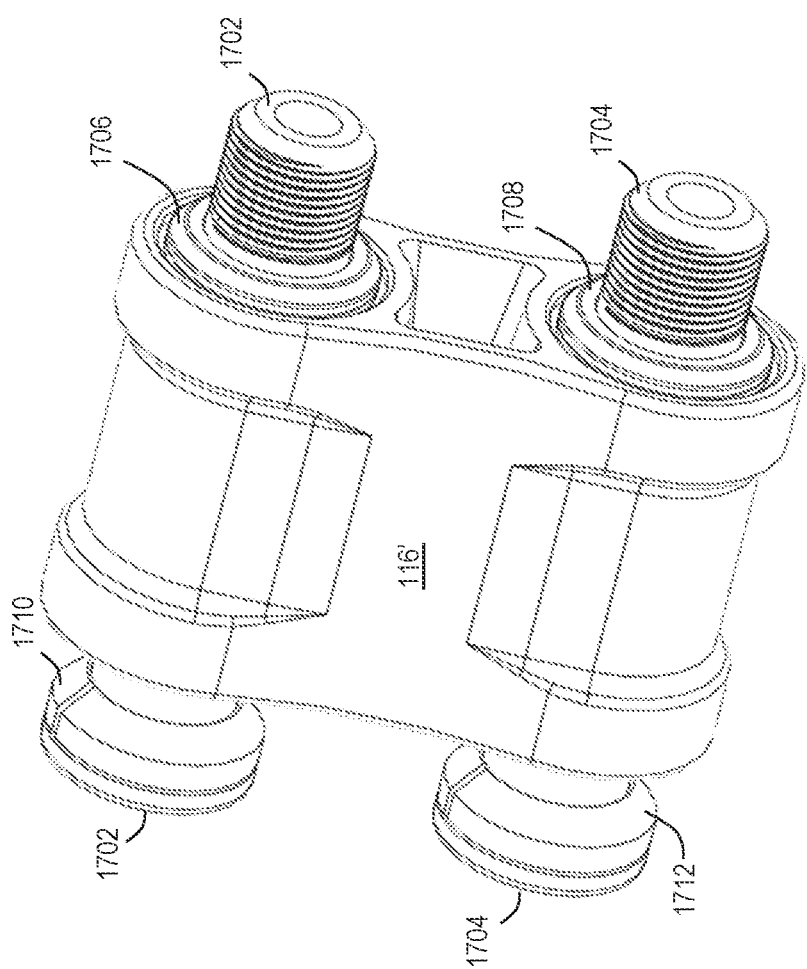
FIG. 17 is an isometric view of one of the links of the suspension of FIGS. 15 and 16.

As depicted in FIG. 17, link 116' (and thus link 108') is coupled to front triangle 102' of the bike frame by a pair of bolts 1702 and 1704, which pass through apertures in the link and are rotatably coupled using respective bearings 1706 and 1708. Also see FIG. 20. Bolts 1702 and 1704 are threaded at a distal end, and each of the bolts has a split conical spacer (1710, 1712) coupled to the head of the bolt. With respect to bolt 1702, spacer 1710 is snap-fit to a lip of the bolt head, and a gasket 1714 is disposed between the spacer and the bolt head.

Conical spacer 1710 has a single split configured to give the spacer a variable effective diameter. In this example, the ends of conical spacer 1710 remain aligned (e.g., generally coplanar) whether or not the spacer is installed. In other words, the ends of the spacer at the split are not naturally offset from each other in a transverse direction. Many split washers typically have such an offset, to provide added spring force in an axial direction when installed and tightened.

Figure 22:
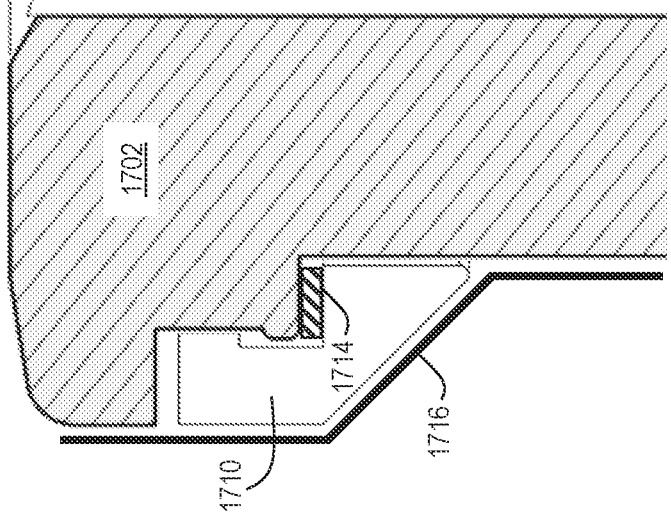
FIG. 22 is a sectional view of a portion of the bolt and associated hardware of FIG. 20.

As depicted in the sectional view of FIG. 22, the conical spacer has a profile that follows a tapered internal profile 1716 of the bike frame aperture. Accordingly, the split spacer tightens around the shaft of bolt 1702 and wedges into the bike frame aperture as the bolt is tightened. This arrangement biases the bolt against rotation and loosening. Although bolts 1702 and 1704 define the axes of rotation of two rotating joints of the linkage, relative motion is facilitated by the bearings and not the bolts themselves.

The following paragraphs describe various illustrative combinations of features relating to the six-bar suspension systems described herein.

J0. A bicycle comprising:
a bicycle frame; and
a rear suspension system coupling the bicycle frame to a rear wheel, the rear suspension system in combination with the frame comprising a six-bar linkage, the six-bar linkage including:
a chain stay link comprising a first ternary link coupled at a front end portion by a first joint to a first binary link and by a second joint to a second binary link, and coupled at a rear end portion by a third joint to a seat stay link comprising a third binary link;
a fourth binary link coupled by a fourth joint to the seat stay link;
wherein the first binary link is coupled to the bicycle frame by a fifth joint, the second binary link is coupled to the bicycle frame by a sixth joint, and the fourth binary link is coupled to the bicycle frame by a seventh joint, such that the bicycle frame is a second ternary link of the six-bar linkage; and
a shock absorber coupling the fourth binary link to the bicycle frame;
wherein the first binary link is disposed below the second binary link; and
wherein the rear wheel is rotatably coupled to the seat stay link of the rear suspension system.

J1. The bicycle of J0, wherein the fourth binary link extends forward of the seventh joint, such that the fourth binary link comprises a rocker arm coupled on one side of the seventh joint to the seat stay link and on another side of the seventh joint to the shock absorber.

J2. The bicycle of J0 or J1, wherein the rear wheel is rotatably coupled to the seat stay link proximate the third joint.

J3. The bicycle of J2, wherein the rear wheel is coupled to the seat stay link by a rotating joint that is offset from the third joint by at most approximately 200 mm.

J4. The bicycle of any one of paragraphs J0 through J3, wherein the seventh joint is on a seat tube of the bicycle frame, and the shock absorber is oriented parallel to the seat tube.

J5. The bicycle of any one of paragraphs J0 through J4, wherein the first and second joints of the chain stay link are spaced closer to each other than are the fifth and sixth joints.

J6. The bicycle of any one of paragraphs J0 through J5, wherein the first and second binary links have a same length.

J7. The bicycle of any one of paragraphs J0 through J6, wherein the first binary link is interchangeable with the second binary link without altering a behavior of the suspension.

J8. The bicycle of any one of paragraphs J0 through J7, wherein the first binary link and the second binary link are identical to each other.

K0. A bicycle comprising:
a bicycle frame; and
a rear suspension system coupling the bicycle frame to a rear wheel, the rear suspension system in combination with the frame comprising a six-bar linkage, the six-bar linkage including:
a chain stay link comprising a first ternary link coupled at a front end portion by a first joint to a first binary link and by a second joint to a second binary link, and coupled at a rear end portion by a third joint to a seat stay link comprising a third binary link;
a fourth binary link coupled by a fourth joint to the seat stay link;
wherein the first binary link is coupled to the bicycle frame by a fifth joint, the second binary link is coupled to the bicycle frame by a sixth joint, and the fourth binary link is coupled to the bicycle frame by a seventh joint, such that the bicycle frame is a second ternary link of the six-bar linkage; and
a shock absorber coupling the fourth binary link to the bicycle frame;
wherein the first binary link is disposed below the second binary link;
wherein, when the shock absorber transitions from an uncompressed state to a fully compressed state, overall rotation of the first binary link is in an opposite direction with respect to overall rotation of the second binary link.

K0.1 The bicycle of K0, wherein, when the shock absorber transitions from the uncompressed state to the fully compressed state, the first binary link is rotated such that overall movement of the first binary link is clockwise with respect to the fifth joint as viewed from a right side of the bicycle frame.

K1. The bicycle of K0 or K0.1, wherein the rear wheel is coupled to the rear suspension system at a rotational joint of the seat stay link.

K2. The bicycle of K1, wherein the rear wheel is rotatably coupled to the seat stay link proximate the third joint.

K3. The bicycle of K2, wherein the rear wheel is coupled to the seat stay link by a rotating joint that is offset from the third joint by at most approximately 200 mm.

K4. The bicycle of any one of paragraphs K0 through K3, wherein the fourth binary link extends forward of the seventh joint, such that the fourth binary link comprises a rocker arm coupled on one side of the seventh joint to the seat stay link and on another side of the seventh joint to the shock absorber.

K5. The bicycle of any one of paragraphs K0 through K4, wherein the seventh joint is on a seat tube of the bicycle frame, and the shock absorber is oriented parallel to the seat tube.

K6. The bicycle of any one of paragraphs K0 through K5, wherein the first and second joints of the chain stay link are spaced closer to each other than are the fifth and sixth joints.

K7. The bicycle of any one of paragraphs K0 through K6, wherein the first and second binary links have a same length.

K8. The bicycle of any one of paragraphs K0 through K7, wherein the first binary link is interchangeable with the second binary link without altering a behavior of the suspension.

K9. The bicycle of any one of paragraphs K0 through K8, wherein the first binary link and the second binary link are identical to each other.

D. Illustrative Combinations and Additional Examples

This section describes additional aspects and features of rear suspension bicycles, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A rear suspension bicycle, comprising:
a front triangle; and
a first linkage member, a second linkage member, a third linkage member, a fourth linkage member, a fifth linkage member, and a shock absorber;
wherein the first linkage member has a pivotal connection with the front triangle and a pivotal connection with the second linkage member;
wherein the second linkage member has a pivotal connection with the first linkage member, a pivotal connection with the third linkage member, and a pivotal connection with the fifth linkage member;
wherein the third linkage member has a pivotal connection with the second linkage member, a pivotal connection with a rear wheel rotation axis, and a pivotal connection with the fourth linkage member;
wherein the fourth linkage member has a pivotal connection with the third linkage member, a pivotal connection with the front triangle, and a pivotal connection with the shock absorber;
wherein the fifth linkage member has a pivotal connection with the second linkage member; and
wherein the shock absorber has a pivotal connection with the fourth linkage member and a pivotal connection with the front triangle, and is configured to control movement of the first through fifth linkage members relative to the front triangle.

A2. The rear suspension bicycle of paragraph A1, wherein the fifth linkage member has a pivotal connection with the front triangle.

A3. The rear suspension bicycle of paragraph A1, wherein the fifth linkage member has a pivotal connection with the fourth linkage member.

A4. The rear suspension bicycle of paragraph A1, wherein the front triangle includes a seat tube, the shock absorber is disposed in front of the seat tube, and the shock absorber has a substantially vertical orientation.

A5. The rear suspension bicycle of paragraph A1, wherein the first through fifth linkage members, along with the shock absorber, compose a system having one degree of freedom.

A6. The rear suspension bicycle of paragraph A1, wherein the first, second, third, fourth, and fifth linkage members and the shock absorber are configured so that the rear wheel rotation axis traces a non-circular arc when the shock absorber moves between an uncompressed state and a compressed state, and wherein an center of curvature for the non-circular arc moves forward as the shock absorber is compressed.

A7. The rear suspension bicycle of paragraph A1, wherein a shock rate rises generally linearly with respect to vertical wheel travel distance as the shock absorber is compressed from a fully uncompressed state to a fully compressed state.

A8. The rear suspension bicycle of paragraph A7, wherein a rate of change of chainstay length with respect to vertical wheel travel distance is relatively high when the shock absorber is at sag and relatively low when the shock absorber is more deeply compressed.

A9. The rear suspension bicycle of paragraph A8, wherein a change in the shock rate with respect to vertical wheel travel distance is independent of a rate of change of a chainstay length with respect to vertical wheel travel distance as the shock absorber is compressed.

A10. The rear suspension bicycle of paragraph A1, wherein an instant center moves rearward from an initial location in front of a pedaling axis as the shock absorber is compressed.

A11. The rear suspension bicycle of paragraph A1, wherein the first through fifth linkage members define a plurality of instant centers.

A12. The rear suspension bicycle of paragraph A1, wherein an acceleration anti-squat value decreases as the shock absorber is compressed.

A13. The rear suspension bicycle of paragraph A12, wherein the acceleration anti-squat value decreases from a value substantially equal to 100% to a value of substantially equal to zero as the shock absorber is compressed from a fully uncompressed state to a fully compressed state.

A14. The rear suspension bicycle of paragraph A1, wherein a braking anti-rise value has a period of decrease followed by a period of increase as the shock absorber is compressed from a fully uncompressed state to a fully compressed state.

A15. The rear suspension bicycle of paragraph A1, wherein a braking anti-rise value has a period of increase followed by a period of decrease as the shock absorber is compressed from a fully uncompressed state to a fully compressed state.

A16. The rear suspension bicycle of paragraph A1, wherein a braking anti-rise value generally increases as the shock absorber is compressed from a fully uncompressed state to a fully compressed state.

A17. The rear suspension bicycle of paragraph A1, wherein an acceleration anti-squat value is decoupled from a braking anti-rise value as the shock absorber is compressed.

B0. A bicycle comprising:
a frame including a front triangle; and
a rear suspension system having a shock absorber and coupling the front triangle to a rear wheel, the rear suspension in combination with the front triangle comprising a six-bar linkage having a Stephenson topology.

B1. The bicycle of B0, wherein the six-bar linkage has a Stephenson III topology.

B2. The bicycle of B0, wherein the six-bar linkage has a Stephenson II topology.

C0. A bicycle comprising:
a frame including a rigid front triangle; and
a rear suspension system having a shock absorber and coupling the front triangle to a rear wheel, the rear suspension in combination with the front triangle comprising a six-bar linkage having exactly two ternary links separated from each other by at least one binary link, such that the two ternary links have no joints in common;
wherein a first ternary link of the two ternary links comprises a chain stay link.

C1. The bicycle of C0, wherein a second ternary link of the two ternary links comprises a portion of the front triangle.

C2. The bicycle of C1, wherein the portion of the front triangle is a seat tube.

C2A. The bicycle of C1, wherein the portion of the front triangle is a top tube.

C3. The bicycle of C0, wherein the chain stay link is coupled at a rear end portion to a seat stay link by a first rotating joint, and coupled at a front end portion to a pair of binary links by a second rotating joint and a third rotating joint, respectively.

C4. The bicycle of C3, wherein the pair of binary links connect the chain stay link to a second ternary link.

C5. The bicycle of C4, wherein the second ternary link comprises a portion of the front triangle.

C6. The bicycle of C3, wherein one link of the pair of binary links connects the chain stay link to the front triangle and the other link of the pair of binary links connects the chain stay link to a second ternary link.

C7. The bicycle of C0, wherein a second ternary link of the two ternary links comprises a rocker arm coupling a seat stay link to the front triangle.

C8. The bicycle of C7, wherein the rocker arm is coupled to the front triangle by a rotating joint and by the shock absorber.

C9. The bicycle of C0, wherein the chain stay link is coupled to the second ternary link by a total of no more than two binary links.

C10. The bicycle of C9, wherein one of the no more than two binary links is a seat stay link.

C11. The bicycle of C0, wherein the shock absorber is coupled between a down tube of the front triangle and one of the links of the six-bar linkage.

C12. The bicycle of C11, wherein the one of the links comprises a rocker arm rotationally joined to a seat tube of the front triangle.

C13. The bicycle of C0, wherein the six-bar linkage comprises a seat stay link coupled to the chain stay link by a first rotating joint, and the rear tire is coupled to the seat stay link by a second rotating joint that is offset from the first rotating joint by a selected distance.

C14. The bicycle of C13, wherein the second rotating joint is disposed proximate and rearward of the first rotating joint.

C15. The bicycle of C13, wherein the selected distance is at most approximately 200 mm.

D0. A bicycle comprising:
a bicycle frame; and
a rear suspension system coupling the bicycle frame to a rear wheel, the rear suspension system in combination with the frame comprising a six-bar linkage, the six-bar linkage including:
a chain stay link comprising a first ternary link coupled at a front end portion by a first joint to a first binary link and by a second joint to a second binary link, and coupled at a rear end portion by a third joint to a seat stay link comprising a third binary link;
a fourth binary link coupled by a fourth joint to the seat stay link;
wherein the first binary link is coupled to the bicycle frame by a fifth joint, the second binary link is coupled to the bicycle frame by a sixth joint, and the fourth binary link is coupled to the bicycle frame by a seventh joint, such that the bicycle frame is a second ternary link of the six-bar linkage; and
a shock absorber coupling the fourth binary link to the bicycle frame.

D1. The bicycle of D0, wherein the fourth binary link extends forward of the seventh joint, such that the fourth binary link comprises a rocker arm coupled on one side of the seventh joint to the seat stay link and on the other side of the seventh joint to the shock absorber.

D2. The bicycle of D1, wherein the shock absorber is connected between the fourth binary link and a down tube of the bicycle frame.

D3. The bicycle of D0, wherein the rear wheel is rotatably coupled to the seat stay link proximate the third joint.

D4. The bicycle of D3, wherein an axle of the rear wheel is spaced less than approximately 200 mm from the third joint.

D5. The bicycle of D0, wherein the seventh joint is on a top tube of the bicycle frame.

D6. The bicycle of D0, wherein the seventh joint is on a seat tube of the bicycle frame.

D7. The bicycle of D6, wherein the shock absorber has a generally vertical orientation.

D8. The bicycle of D6, wherein the shock absorber is generally parallel and adjacent to the seat tube.

D9. The bicycle of D0, wherein the first and second joints of the chain stay link are spaced farther apart from each other than are the fifth and sixth joints.

D10. The bicycle of D0, wherein the first and second joints of the chain stay link are spaced more closely together than are the fifth and sixth joints.

D11. The bicycle of D0, wherein the second joint of the chain stay link is disposed generally between the fifth joint and the sixth joint.

D12. The bicycle of D0, wherein the suspension is transitionable between an uncompressed configuration, in which the shock absorber is uncompressed and the four binary links and the chain stay link are in respective first positions, and a compressed configuration, in which the shock absorber is compressed and the four binary links and the chain stay link are in respective second positions, each of the second positions being oriented in a clockwise direction relative to the respective first positions when viewed from a right side of the bicycle.

E0. A bicycle comprising:
a bicycle frame; and
a rear suspension system coupling the bicycle frame to a rear wheel, the rear suspension system in combination with the frame comprising a six-bar linkage, the six-bar linkage including:
a chain stay link comprising a first ternary link coupled at a front end portion by a first joint to a first binary link and by a second joint to a second binary link, and coupled at a rear end portion by a third joint to a seat stay link comprising a third binary link;
a rocker arm coupled by a fourth joint to the seat stay link;
wherein the first binary link is coupled to the rocker arm by a fifth joint, the second binary link is coupled to the bicycle frame by a sixth joint, and the rocker arm is coupled to the bicycle frame by a seventh joint, such that the rocker arm comprises a second ternary link of the six-bar linkage and the bicycle frame comprises a fourth binary link of the six-bar linkage; and
a shock absorber coupling the rocker arm to the bicycle frame.

E1. The bicycle of E0, wherein
the seventh joint defines a fulcrum of the rocker arm, the rocker arm extending forward of the fulcrum.

E2. The bicycle of E1, wherein the rocker arm is coupled on a rear side of the fulcrum to the seat stay link and to the chain stay link, and the rocker arm is coupled on a forward side of the fulcrum to the shock absorber.

E3. The bicycle of E2, wherein the shock absorber is connected between the rocker arm and a down tube of the bicycle frame.

E4. The bicycle of E0, wherein the rear wheel is rotatably coupled to the seat stay link proximate the third joint.

E5. The bicycle of E4, wherein an axle of the rear wheel is spaced less than approximately 200 mm from the third joint.

E7. The bicycle of E0, wherein the seventh joint is on a seat tube of the bicycle frame.

E8. The bicycle of E7, wherein the shock absorber has a generally vertical orientation.

E9. The bicycle of E7, wherein the shock absorber is generally parallel and adjacent to the seat tube.

E10. The bicycle of E0, wherein the first and second joints of the chain stay link are spaced more closely together than are the fifth and sixth joints.

E11. The bicycle of E0, wherein the second joint of the chain stay link is disposed generally lower than the sixth joint.

E12. The bicycle of E0, wherein the suspension is transitionable between an uncompressed configuration, in which the shock absorber is uncompressed and the four binary links and the chain stay link are in respective first positions, and a compressed configuration, in which the shock absorber is compressed and the four binary links and the chain stay link are in respective second positions, each of the second positions being oriented in a clockwise direction relative to the respective first positions when viewed from a right side of the bicycle.

F0. A bicycle comprising:
a bicycle frame; and
a rear suspension system coupling the bicycle frame to a rear wheel, the rear suspension system in combination with the frame comprising a six-bar linkage, the six-bar linkage including:
a chain stay link comprising a first ternary link coupled at a front end portion by a first joint to a first binary link and by a second joint to a second binary link, and coupled at a rear end portion by a third joint to a seat stay link comprising a third binary link;
a fourth binary link coupled by a fourth joint to the seat stay link;
wherein the first binary link is coupled to the bicycle frame by a fifth joint, the second binary link is coupled to the bicycle frame by a sixth joint, and the fourth binary link is coupled to the bicycle frame by a seventh joint, such that the bicycle frame is a second ternary link of the six-bar linkage;
wherein the first binary link is disposed above the second binary link; and
a shock absorber coupling the fourth binary link to the bicycle frame;
wherein the rear suspension system is transitionable between:
(a) an uncompressed configuration, in which the shock absorber is uncompressed, and
(b) a compressed configuration, in which the shock absorber is compressed and, when viewed from a right side of the bicycle, the first binary link is rotated counterclockwise with respect to the fifth joint and the second binary link is rotated clockwise with respect to the sixth joint, relative to the uncompressed configuration.

F1. The bicycle of F0, wherein the second binary link is configured to rotate in a counterclockwise direction and then a clockwise direction, with respect to the sixth joint, when the rear suspension system transitions from the uncompressed configuration to the compressed configuration.

F2. The bicycle of F0 or F1, wherein the fourth binary link extends forward of the seventh joint, such that the fourth binary link comprises a rocker arm coupled on one side of the seventh joint to the seat stay link and on the other side of the seventh joint to the shock absorber.

F3. The bicycle of F2, wherein the shock absorber is connected between the fourth binary link and a down tube of the bicycle frame.

F4. The bicycle of any one of paragraphs F0 through F3, wherein the rear wheel is rotatably coupled to the seat stay link proximate the third joint.

F5. The bicycle of any one of paragraphs F0 through F4, wherein the seventh joint is on a seat tube of the bicycle frame.

F6. The bicycle of any one of paragraphs F0 through F5, wherein the first and second joints of the chain stay link are spaced more closely together than are the fifth and sixth joints.

F7. The bicycle of any one of paragraphs F0 through F6, wherein the second joint of the chain stay link is disposed generally between the fifth joint and the sixth joint.

G0. A bicycle comprising:
a bicycle frame; and
a rear suspension system coupling the bicycle frame to a rear wheel, the rear suspension system in combination with the frame comprising a six-bar linkage, the six-bar linkage including:
a chain stay link comprising a first ternary link coupled at a front end portion by a first joint to a first binary link and by a second joint to a second binary link, and coupled at a rear end portion by a third joint to a seat stay link comprising a third binary link;
a fourth binary link coupled by a fourth joint to the seat stay link;

wherein the first binary link is coupled to the bicycle frame by a fifth joint, the second binary link is coupled to the bicycle frame by a sixth joint, and the fourth binary link is coupled to the bicycle frame by a seventh joint, such that the bicycle frame is a second ternary link of the six-bar linkage;

wherein the first binary link is disposed below the second binary link; and a shock absorber coupling the fourth binary link to the bicycle frame;

wherein the rear suspension system is transitionable between:

(a) an uncompressed configuration, in which the shock absorber is uncompressed, and (b) a compressed configuration, in which the shock absorber is compressed and, when viewed from a right side of the bicycle, the first binary link is rotated counterclockwise with respect to the fifth joint and the second binary link is rotated clockwise with respect to the sixth joint, relative to the uncompressed configuration.

G1. The bicycle of G0, wherein the fourth binary link extends forward of the seventh joint, such that the fourth binary link comprises a rocker arm coupled on one side of the seventh joint to the seat stay link and on the other side of the seventh joint to the shock absorber.

G2. The bicycle of G2, wherein the shock absorber is connected between the fourth binary link and a down tube of the bicycle frame.

G3. The bicycle of any one of paragraphs G0 through G2, wherein the seventh joint is on a seat tube of the bicycle frame.

G4. The bicycle of any one of paragraphs G0 through G3, wherein the second joint of the chain stay link is disposed generally between the fifth joint and the sixth joint.

H0. A bicycle comprising:

a bicycle frame; and a rear suspension system coupling the bicycle frame to a rear wheel, the rear suspension system in combination with the frame comprising a six-bar linkage, the six-bar linkage including:

a chain stay link comprising a first ternary link coupled at a front end portion by a first joint to a first binary link and by a second joint to a second binary link, and coupled at a rear end portion by a third joint to a seat stay link comprising a third binary link;

a fourth binary link coupled by a fourth joint to the seat stay link;

wherein the first binary link is coupled to the bicycle frame by a fifth joint, the second binary link is coupled to the bicycle frame by a sixth joint, and the fourth binary link is coupled to the bicycle frame by a seventh joint, such that the bicycle frame is a second ternary link of the six-bar linkage; and a shock absorber coupling the fourth binary link to the bicycle frame;

wherein the rear suspension system is transitionable between:

(a) an uncompressed configuration, in which the shock absorber is uncompressed, and (b) a compressed configuration, in which the shock absorber is compressed and, when viewed from a right side of the bicycle, the first binary link is rotated clockwise with respect to the fifth joint and the second binary link is rotated clockwise with respect to the sixth joint, relative to the uncompressed configuration.

H1. The bicycle of H0, wherein the first and second joints of the chain stay link are spaced farther apart from each other than are the fifth and sixth joints.

H2. The bicycle of H0 or H1, wherein the fourth binary link extends forward of the seventh joint, such that the fourth binary link comprises a rocker arm coupled on one side of the seventh joint to the seat stay link and on the other side of the seventh joint to the shock absorber.

H3. The bicycle of H2, wherein the shock absorber is connected between the fourth binary link and a down tube of the bicycle frame.

H4. The bicycle of any one of paragraphs H0 through H3, wherein the seventh joint is on a seat tube of the bicycle frame.

H5. The bicycle of H4, wherein the shock absorber is parallel and adjacent to the seat tube.

H6. The bicycle of any one of paragraphs H0 through H5, wherein the second joint of the chain stay link is disposed generally between the fifth joint and the sixth joint.

Advantages, Features, and Benefits

The different embodiments of the bicycle rear suspension systems described herein provide several advantages over known solutions for providing rear suspension to a bicycle. For example, the illustrative embodiments of rear suspension bicycles described herein allow pedaling-related variables to be decoupled from shock absorber-related variables. Additionally, and among other benefits, illustrative embodiments of the rear suspension bicycles described herein allow for a linearly or monotonically rising shock rate. Additionally, and among other benefits, illustrative embodiments of the rear suspension bicycles described herein allow a change in the shock rate with respect to vertical wheel travel distance to be independent of a rate of change in chainstay length with respect to vertical wheel travel distance as the shock absorber is compressed. Additionally, and among other benefits, illustrative embodiments of the rear suspension bicycles described herein allow for an empty space between the top tube and the down tube of the front triangle for accommodating other bicycle equipment. No known system or device can perform these functions. However, not all embodiments described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A bicycle comprising:
a bicycle frame; and
a rear suspension system coupling the bicycle frame to a rear wheel, the rear suspension system in combination with the frame comprising a six-bar linkage, the six-bar linkage including:
a chain stay link having a front end portion coupled to the bicycle frame by a first binary link and a second binary link; and
a seat stay link pivotably coupled to a rear end portion of the chain stay link and pivotably coupled to a rocker arm attached to the bicycle frame;
wherein the first and second binary links have a same length.

2. The bicycle of claim 1, wherein the first binary link is coupled to the bicycle frame by a bolt passing through an aperture in the link, the bolt having a bolt head at a proximal end and a threaded portion at a distal end; wherein a split conical spacer is snap-fit to a lip of the bolt head, the spacer configured to resist rotation of the bolt with respect to the bicycle frame.

3. The bicycle of claim 2, further comprising a bearing disposed between the bolt and an inner wall of the aperture, such that the first binary link is configured to pivot on the bearing with respect to the bicycle frame.

4. The bicycle of claim 1, wherein the second binary link is identical to the first binary link.

5. The bicycle of claim 1, wherein the first binary link is interchangeable with the second binary link without altering a behavior of the suspension.

6. The bicycle of claim 1, further comprising a shock absorber mounted between the rocker arm and the bicycle frame.

7. The bicycle of claim 6, wherein a long axis of the shock absorber is oriented generally parallel to a seat tube of the bicycle frame.

8. The bicycle of claim 6, wherein a long axis of the shock absorber is oriented generally transverse to a top tube of the bicycle frame.

9. The bicycle of claim 1, further comprising a rear wheel coupled to the seat stay link.

10. A bicycle comprising:
a bicycle frame; and
a rear suspension system coupling the bicycle frame to a rear wheel, the rear suspension system in combination with the frame comprising a six-bar linkage, the six-bar linkage including:
a chain stay link having a front end portion coupled to the bicycle frame by a first binary link and a second binary link, the second binary link being disposed above the first binary link, wherein the first and second binary links have a same length;
a seat stay link pivotably coupled to a rear end portion of the chain stay link and pivotably coupled to a rocker arm attached to the bicycle frame; and
a shock absorber coupled between the rocker arm and the bicycle frame;
wherein, when the shock absorber transitions from an uncompressed state to a fully compressed state, overall rotation of the first binary link is in an opposite direction with respect to overall rotation of the second binary link.

11. The bicycle of claim 10, wherein the first binary link is coupled to the bicycle frame by a bolt passing through an aperture in the link, the bolt having a bolt head at a proximal end and a threaded portion at a distal end; wherein a split conical spacer is snap-fit to a lip of the bolt head, the spacer configured to resist rotation of the bolt with respect to the bicycle frame.

12. The bicycle of claim 11, further comprising a bearing disposed between the bolt and an inner wall of the aperture, such that the first binary link is configured to pivot on the bearing with respect to the bicycle frame.

13. The bicycle of claim 10, wherein the second binary link is identical to the first binary link.

14. The bicycle of claim 10, wherein the first binary link is interchangeable with the second binary link without altering a behavior of the suspension.

15. The bicycle of claim 10, further comprising a rear wheel coupled to the seat stay link.

16. The bicycle of claim 15, wherein the seat stay link is pivotably coupled to the rear end portion of the chain stay link at a joint, and the rear wheel is rotatably coupled to the seat stay link proximate to the joint.

17. The bicycle of claim 10, wherein a long axis of the shock absorber is oriented generally parallel to a seat tube of the bicycle frame.

18. The bicycle of claim 10, wherein a long axis of the shock absorber is oriented generally transverse to a top tube of the bicycle frame.

19. The bicycle of claim 10, wherein rear joints of the first and second binary links are spaced closer to each other than are forward joints of the first and second binary links.

* * * * *